United States Patent
Srinivasa et al.

(10) Patent No.: US 9,154,969 B1
(45) Date of Patent: Oct. 6, 2015

(54) WIRELESS DEVICE CALIBRATION FOR IMPLICIT TRANSMIT

(71) Applicant: MARVELL INTERNATIONAL LTD., Hamilton (BM)

(72) Inventors: Sudhir Srinivasa, Sunnyvale, CA (US); Xiayu Zheng, Mountain View, CA (US); Hongyuan Zhang, Fremont, CA (US); Rohit U. Nabar, Sunnyvale, CA (US); Riddhi Madani, Sunnyvale, CA (US); Atul Salhotra, Santa Clara, CA (US); Erik Heinke, Sunnyvale, CA (US); Brian Bosso, Santa Clara, CA (US)

(73) Assignee: MARVELL INTERNATIONAL LTD., Hamilton (BM)

( * ) Notice: Subject to any disclaimer, the term of this patent is extended or adjusted under 35 U.S.C. 154(b) by 150 days.

(21) Appl. No.: 13/626,841

(22) Filed: Sep. 25, 2012

Related U.S. Application Data

(60) Provisional application No. 61/540,999, filed on Sep. 29, 2011.

(51) Int. Cl.
*G06F 11/00* (2006.01)
*H04J 1/16* (2006.01)
(Continued)

(52) U.S. Cl.
CPC ........... *H04W 24/00* (2013.01); *H04L 43/0852* (2013.01)

(58) Field of Classification Search
CPC .... H04W 24/00; H04L 43/50; H04L 43/0852
USPC .................. 370/252, 328, 329, 254; 342/373
See application file for complete search history.

(56) References Cited

U.S. PATENT DOCUMENTS

| | | | |
|---|---|---|---|
| 6,584,161 | B2 | 6/2003 | Hottinen et al. |
| 6,760,385 | B1 | 7/2004 | Goodson |

(Continued)

FOREIGN PATENT DOCUMENTS

| | | |
|---|---|---|
| JP | 2006505155 A | 2/2006 |
| JP | 2009530873 A | 8/2009 |

(Continued)

OTHER PUBLICATIONS

IEEE STD 802.11ac/D2.0 "Draft STANDARD for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, Jan. 2012.

(Continued)

*Primary Examiner* — Chuong T Ho

(57) ABSTRACT

In a method of calibrating a wireless communication device, a first sounding packet is transmitted from the wireless communication device to a calibration station. A first channel descriptor is generated based on the first sounding packet. A second sounding packet is transmitted from the calibration station to the wireless communication device. A second channel descriptor is generated based on the second sounding packet. The first channel descriptor and the second channel descriptor are obtained at a controller. Calibration coefficients indicative of one or both of phase imbalance and amplitude imbalance between a receive radio frequency (RF) chain and a transmit RF chain at the wireless communication device are generated based on the first and the second channel descriptors. The calibration coefficients are sent from the controller to the wireless communication device.

31 Claims, 12 Drawing Sheets

(51) Int. Cl.
*H04L 1/00* (2006.01)
*H04L 12/26* (2006.01)
*H04W 24/00* (2009.01)

(56) References Cited

U.S. PATENT DOCUMENTS

| | | | |
|---|---|---|---|
| 6,760,388 B2 | 7/2004 | Ketchum et al. | |
| 7,065,146 B1 | 6/2006 | Lou et al. | |
| 7,194,042 B2 | 3/2007 | Walton et al. | |
| 7,206,354 B2 | 4/2007 | Wallace et al. | |
| 7,486,740 B2 | 2/2009 | Inanoglu | |
| 7,570,210 B1* | 8/2009 | Nabar et al. | 342/373 |
| 7,599,332 B2 | 10/2009 | Zelst et al. | |
| 7,729,439 B2* | 6/2010 | Zhang et al. | 375/267 |
| 7,742,390 B2 | 6/2010 | Mujtaba | |
| 7,787,554 B1 | 8/2010 | Nabar et al. | |
| 7,847,732 B1* | 12/2010 | Nabar et al. | 342/373 |
| 7,856,050 B1* | 12/2010 | Wiss et al. | 375/224 |
| 7,876,715 B1 | 1/2011 | Jin et al. | |
| 7,965,619 B2 | 6/2011 | Taira et al. | |
| 7,978,781 B2 | 7/2011 | Zhang et al. | |
| 8,064,502 B2* | 11/2011 | Sawai et al. | 375/219 |
| 8,155,138 B2 | 4/2012 | van Nee | |
| 8,229,017 B1 | 7/2012 | Lee et al. | |
| 8,270,909 B2 | 9/2012 | Zhang et al. | |
| 8,289,869 B2 | 10/2012 | Sawai | |
| 8,320,851 B2* | 11/2012 | Takano et al. | 455/114.2 |
| 8,340,597 B1 | 12/2012 | Nabar et al. | |
| 8,374,273 B1 | 2/2013 | Zhang et al. | |
| 8,428,168 B1 | 4/2013 | Zhang et al. | |
| 8,525,937 B2* | 9/2013 | Yang et al. | 348/726 |
| 8,526,351 B2 | 9/2013 | Fischer et al. | |
| 8,619,907 B2 | 12/2013 | Mujtaba et al. | |
| 8,644,368 B1 | 2/2014 | Zhang et al. | |
| 8,724,720 B2 | 5/2014 | Srinivasa et al. | |
| 8,855,228 B2 | 10/2014 | Zhang et al. | |
| 8,891,597 B1 | 11/2014 | Zhang et al. | |
| 8,891,640 B2 | 11/2014 | Nabar et al. | |
| 8,971,178 B1 | 3/2015 | Nabar et al. | |
| 2003/0224750 A1 | 12/2003 | Sampath | |
| 2004/0082356 A1 | 4/2004 | Walton et al. | |
| 2004/0087324 A1 | 5/2004 | Ketchum et al. | |
| 2005/0052991 A1 | 3/2005 | Kadous | |
| 2005/0063378 A1 | 3/2005 | Kadous | |
| 2005/0064908 A1 | 3/2005 | Boariu et al. | |
| 2005/0078762 A1 | 4/2005 | Ketchum et al. | |
| 2005/0128953 A1 | 6/2005 | Wallace et al. | |
| 2005/0169391 A1 | 8/2005 | Takeda et al. | |
| 2005/0185728 A1 | 8/2005 | Wallace et al. | |
| 2005/0265225 A1 | 12/2005 | Mahadevappa et al. | |
| 2006/0063492 A1 | 3/2006 | Iacono et al. | |
| 2006/0079221 A1 | 4/2006 | Grant et al. | |
| 2006/0093067 A1 | 5/2006 | Jalali et al. | |
| 2006/0098580 A1 | 5/2006 | Li et al. | |
| 2006/0104381 A1 | 5/2006 | Menon et al. | |
| 2006/0104382 A1 | 5/2006 | Yang et al. | |
| 2006/0126752 A1 | 6/2006 | Hansen et al. | |
| 2006/0176977 A1 | 8/2006 | Jafarkhani et al. | |
| 2006/0183504 A1 | 8/2006 | Tanaka et al. | |
| 2006/0255989 A1 | 11/2006 | Kim et al. | |
| 2007/0041457 A1 | 2/2007 | Kadous et al. | |
| 2007/0127586 A1 | 6/2007 | Hafeez | |
| 2007/0195811 A1 | 8/2007 | Basson et al. | |
| 2007/0206504 A1 | 9/2007 | Koo et al. | |
| 2007/0206686 A1 | 9/2007 | Vook et al. | |
| 2007/0224943 A1 | 9/2007 | Gu et al. | |
| 2007/0230373 A1 | 10/2007 | Li et al. | |
| 2007/0268181 A1 | 11/2007 | Howard et al. | |
| 2008/0014870 A1 | 1/2008 | Kim | |
| 2008/0089396 A1 | 4/2008 | Zhang et al. | |
| 2008/0095268 A1 | 4/2008 | Aldana | |
| 2008/0187061 A1 | 8/2008 | Pande et al. | |
| 2008/0198066 A1* | 8/2008 | Kang et al. | 342/174 |
| 2008/0227495 A1 | 9/2008 | Kotecha et al. | |
| 2008/0266176 A1 | 10/2008 | Nabar et al. | |
| 2009/0046800 A1 | 2/2009 | Xu et al. | |
| 2009/0047999 A1 | 2/2009 | Xia et al. | |
| 2009/0061786 A1 | 3/2009 | Malik et al. | |
| 2009/0122777 A1 | 5/2009 | Tao et al. | |
| 2009/0175204 A1* | 7/2009 | Kim | 370/256 |
| 2009/0196163 A1 | 8/2009 | Du | |
| 2009/0207765 A1 | 8/2009 | Yamaura | |
| 2009/0252250 A1 | 10/2009 | Heath, Jr. et al. | |
| 2009/0290563 A1 | 11/2009 | Gu et al. | |
| 2010/0020857 A1* | 1/2010 | Takano et al. | 375/219 |
| 2010/0056062 A1 | 3/2010 | Zhang et al. | |
| 2010/0074237 A1 | 3/2010 | Ahn et al. | |
| 2010/0091669 A1* | 4/2010 | Liu et al. | 370/252 |
| 2010/0091675 A1* | 4/2010 | Sawai | 370/252 |
| 2010/0104038 A1 | 4/2010 | Stager et al. | |
| 2010/0111215 A1 | 5/2010 | Nandagopalan et al. | |
| 2010/0172425 A1 | 7/2010 | Pare, Jr. et al. | |
| 2010/0260060 A1* | 10/2010 | Abraham et al. | 370/252 |
| 2010/0309834 A1 | 12/2010 | Fischer et al. | |
| 2011/0002219 A1 | 1/2011 | Kim et al. | |
| 2011/0261860 A1 | 10/2011 | Zhang et al. | |
| 2012/0039196 A1 | 2/2012 | Zhang | |
| 2012/0300864 A1* | 11/2012 | Merlin et al. | 375/260 |

FOREIGN PATENT DOCUMENTS

| | | |
|---|---|---|
| WO | WO-03/103247 | 12/2003 |
| WO | WO-2005/081483 | 9/2005 |
| WO | WO-2005/101772 | 10/2005 |
| WO | WO-2006/031499 A2 | 3/2006 |
| WO | WO-2007103085 A2 | 9/2007 |
| WO | WO-2007108283 | 9/2007 |

OTHER PUBLICATIONS

Gunnam, et al., "Multi-Rate Layered Decoder Architecture for Block LDPC Codes of the IEEE 802.11n Wireless Standard," IEEE International Symposium on Circuits and Systems, 2007 (ISCAS 2007), pp. 1645-1648 (2007).

IEEE Std 802.11ac/D2.1 "Draft STANDARD for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, Mar. 2012.

IEEE Std 802.11a-1999 (Supplement to IEEE Std 802.11-1999) "Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-Speed Physical Layer in the 5 Ghz Band," *The Institute of Electrical and Electronics Engineers, Inc.*, (1999).

IEEE Std 802.11g/D8.2, Apr. 2003 (Supplement to ANSI/IEEE Std 802.11, 1999 (Reaff 2003)) "Draft Supplement to Standard [for] Information technology—Telecommunications and information exchange between system—Local and metropolitan area networks—Specific requirements, Part 11: Wireless LAN Medium Access Control (MAC) and Physical Layer (PHY) specifications: Further Higher Data Rate Extension in the 2.4 GHz Band," *The Institute of Electrical and Electronics Engineers, Inc.*, Apr. 2003.

IEEE Std 802.16e-2005 and IEEE Std 802.16-2004-Cor1-2005 (Amendment and Corrigendum to IEEE Std 802.16-2004), IEEE Standard for Local and metropolitan area networks: Part 16: Air Interface for Fixed and Mobile Broadband Wireless Access Systems: Amendment 2: Physical and Medium Access Control Layers for Combined Fixed and Mobile Operation in Licensed Bands and Corrigendum 1, *The Institute of Electrical and Electronics Engineers, Inc.*, Feb. 28, 2006.

IEEE Std 802.11-2007 (revision of IEEE Std. 802.11-1999) "Information Standard for Information technology—Telecommunications and information exchange between systems—Local and metropolitan area networks—Specific requirements" Part 11: Wireless LAN

(56) References Cited

OTHER PUBLICATIONS

Medium Access Control (MAC) and Physical Layer (PHY) Specifications, *The Institute of Electrical and Electronics Engineers, Inc.*, (Jun. 12, 2007).
S. A. Mujtaba, "IEEE P802.11—Wireless LANs, TGn Sync Proposal Technical Specification," *The Institute of Electrical and Electronics Engineers, Inc.*, doc.: IEEE 802.11-04/0889r6, May 2005.
"IEEE P802.11nTM/D3.00, Draft STANDARD for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Higher Throughput," *The Institute of Electrical and Electronics Engineers, Inc.*, Sep. 2007.
"IEEE Std. 802.11nTM IEEE Standard for Information Technology-Telecommunications and information exchange between systems—Local and metropolitan area networks—Specific requirements, Part 11: Wireless LAN Medium Access Control (MAC) and Physical Layer (PHY) Specifications: Amendment 5: Enhancements for Higher Throughput," *The Institute of Electrical and Electronics Engineers, Inc.*, Oct. 2009.
"IEEE Std 802.16 2009 (Revision of IEEE Std. 802.16-2004), IEEE Standard for Local and metropolitan area networks: Part 16: Air Interface for Broadband Wireless Access Systems," *The Institute of Electrical and Electronics Engineers, Inc.*, May 29, 2009.
IEEE P802.16Rev2/D5 (Jul. 2008) (Revision of IEEE Std 802.16-2004 and consolidates material from IEEE Std 802.16e-2005, Std 802.16-2004/Cor1-2005, Std 802.16f-2005 and Std 802.16g-2007) "Draft Standard for Local and metropolitan area networks: Part 16: Air Interface for Broadband Wireless Access Systems," *The Institute of Electrical and Electronics Engineers, Inc.*, Jun. 2008.
U.S. Appl. No. 13/491,541, filed Jun. 7, 2012.
U.S. Appl. No. 13/185,464, filed Jul. 18, 2011.
U.S. Appl. No. 11/681,548, filed Mar. 2, 2007.
U.S. Appl. No. 12/888,310, filed Sep. 22, 2010.
U.S. Appl. No. 13/077,485, filed Mar. 31, 2011.
U.S. Appl. No. 12/371,367, filed Feb. 13, 2009.
"LitePoint IQnxn plus™ MIMO R&D Test System with IQ signal for WiMAX Software Suite," LitePoint (Jan. 2008).
IEEE Std 802.11ac/D3.0 "Draft Standard for Information Technology—Telecommunications and information exchange between systems—Local and metropolitan area networks—Specific requirements, Part 11: Wireless Lan Medium Access Control (MAC) andPhysical Layer (PHY) specifications: Amendment 4: Enhancements for Very High Throughput for Operation in Bands below 6 GHz," The Institute of Electrical and Electronics Engineers, Inc., Jun. 2012.
IEEE Std 802.11™ 2012 (Revision of IEEE Std 802.Nov. 2007) IEEE Standard for Information technology—Telecommunications and information exchange between systems—Local and metropolitan area networks—Specific requirements Part 11: Wireless LAN Medium Access Control (MAC) and Physical Layer (PHY) specifications, *The Institute of Electrical and Electronics Engineers, Inc.*, pp. 1-2695 (Mar. 29, 2012).
Chen, "Home Network Basis: Transmission Environments and Wired/Wireless Protocols," Prentice Hall (Jul. 2003).
Cisco, "Cisco ClientLink: Optimized Device Performance with 802.11n," Cisco Systems, Inc., pp. 1-7 (2009).
Fischer et al., "Link Adaptation Subfield for VHT, IEEE 802.11-10/1095r0" IEEE 802.11-10, 123rd IEEE 802.11 Wireless Local Area Networks session, Interim Meeting Session, Hilton Waikoloa Village, 1-5, Sep. 12, 2010.
Hiertz, et al., "The IEEE 802.11 Universe," IEEE Communications Magazine, pp. 62-70, Jan. 2010.
Love et al., "An Overview of Limited Feedback in Wireless Communication Systems," IEEE J. on Selected Areas in Communications, vo. 26, No. 8, Oct. 2008.
Merlin et al., "VHT Control and Link Adaptation, IEEE 802.11-11/0040r0," IEEE 802.22-11, 125th IEEE 802.11 Wireless Local Area Networks Session, Interim Meeting Session, Hyatt Centruy Plaza Hotel, Los Angeles, California, 1-15, Jan. 18, 2011.
Perahia, et al., "Gigabit Wireless LANs: an overview of IEEE 802.11ac and 80211ac," ACM Sigmobile Mobile Computing and Communications Review, vo. 15, No. 3, pp. 23-33, Jul. 2011.
Stacey et al., "IEEE P802.11, Wireless LANs, Proposed TGac Draft Amendment," Institute of Electrical and Electronics Engineers, doc. No. IEEE 802.11-10/1361r3 (Jan. 2011).
Stacey et al., "Specification Framework for TGac," document No. IEEE 802.11-09/0992r20, Institute for Electrical and Electronics Engineers, pp. 1-49, Jan. 18, 2011.
van Nee, et al. "The 802.11n MIMO-OFDM Standard for Wireless LAN and Beyond," Wireless Personal Communications, vol. 37, pp. 445-453 (Jun. 2006).
Zhang et al., "11ac Explicit Sounding and Feedback", The Institute of Electrical and Electronics Engineers, doc. No. IEEE 802.11-10/1105r0, (Sep. 2010).
Zhang et al., "Applying Antenna Selection in WLANs for Achieving Broadband Multimedia Communications," IEEE Transactions on Broadcasting, vol. 52, No. 4, Dec. 2006.
Zhang et al., "VHT Link Adaptations IEEE802.11-11/0047r0," IEEE 802.11-11, 125th IEEE 802.11 Wireless Local Area Networks Session, Interim Meeting Session, Hyatt Century Plaza Hotel, Los Angeles, California, 1-11, Jan. 18, 2011.

\* cited by examiner

WIRELESS DEVICE CALIBRATION FOR IMPLICIT TRANSMIT

CROSS-REFERENCES TO RELATED APPLICATIONS

This disclosure claims the benefit of U.S. Provisional Patent Application No. 61/540,999, filed on Sep. 29, 2011, the disclosure of which is incorporated herein by reference.

FIELD OF TECHNOLOGY

The present disclosure relates generally to communication systems and, more particularly, to beamforming techniques used in such communication systems.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

In some wireless communication systems, one or more communication devices employ multiple antennas. Accordingly, a communication channel between two such devices can be a multiple-input, multiple-output (MIMO) channel when both communication devices employ multiple antennas, a single-input, multiple-output (SIMO) channel when a transmitting device ("the transmitter") employs a single transmit antenna and the receiving device ("the receiver") employs multiple receive antennas, or a multiple-input, single-output (MISO) channel when the transmitter employs multiple transmit antennas and the receiver employs a single receive antenna. Referring for simplicity to MIMO communication systems, transmission and reception properties in these systems can be improved by using each of the various transmit antennas to transmit the same signal while phasing (and amplifying) this signal as it is provided to the various transmit antennas to achieve beamforming or beamsteering. Generally speaking, beamforming or beamsteering creates a spatial gain pattern having one or more lobes or beams (as compared to the gain obtained by an omni-directional antenna) in one or more particular directions, while generally reducing the gain over that obtained by an omni-directional antenna in other directions. If the gain pattern is configured to produce a high gain lobe in the direction of each of the receiver antennas or in the direction of the receiver antennas in general, the MIMO system can obtain better transmission reliability between a particular transmitter and a particular receiver, over that obtained by single transmitter-antenna/receiver-antenna systems.

To conduct beamforming in the direction of a receiver, a transmitter generally utilizes a steering matrix determined based on specifics of the forward channel (i.e. the channel from the transmitter to the receiver) to condition the signals applied to various transmission antennas so as to produce the desired transmit gain pattern. In a technique known as explicit beamforming, to determine the specifics of the forward channel, such as the channel state information (CSI) or other measured description of the forward channel, the transmitter first sends training data to the receiver, which then determines or estimates forward channel specifics and/or a steering matrix that specifies beamsteering coefficients for steering signals from the transmitter in the direction of the receiver and then transmits this information back to the transmitter. In implicit beamforming, on the other hand, the transmitter determines specifics of the reverse channel (the channel from the receiver to the transmitter) based on training signals that the transmitter receives from the receiver and estimates the forward channel from the reverse channel by assuming channel reciprocity. However, radio frequency (RF) chain impairments in the form of gain/phase imbalances impair reciprocity between the forward and the reverse channel, and therefore, in implicit beamforming, the transmitter generally compensates for these RF chain imbalances in some manner (e.g., through calibration and/or correction) to achieve the desired transmission pattern.

Some explicit and implicit beamforming techniques as well as some calibration techniques are described in the IEEE 802.11n Draft Standard (2009), incorporated herein fully by reference.

SUMMARY

In one embodiment, a method of calibrating a wireless communication device includes transmitting, from the wireless communication device to a calibration station, a first sounding packet. The method also includes, at the calibration station (i) receiving the first sounding packet and (ii) generating, based on the first sounding packet, a first channel descriptor. The method additionally includes transmitting, from the calibration station to the wireless communication device, a second sounding packet. The method further includes, at the wireless communication device, (i) receiving the second sounding packet and (ii) generating, based on the second sounding packet, a second channel descriptor. The method further still includes obtaining, at a controller, the first channel descriptor and the second channel descriptor, and generating, using the controller and based on the first channel descriptor and the second channel descriptor, calibration coefficients indicative of one or both of (i) phase imbalance and (ii) amplitude imbalance between a receive radio frequency (RF) chain and a transmit RF chain at the wireless communication device. Additionally, the method includes sending the calibration coefficients from the controller to the wireless communication device.

In another embodiment, a calibration system comprises a calibration station configured to receive a first sounding packet from a wireless communication device, generate a first channel descriptor based on the first sounding packet, and transmit a second sounding packet to the wireless communication device. The calibration system also comprises a controller communicatively coupled to the calibration station and to the wireless communication device. The controller is configured to obtain the first channel descriptor from the calibration station, obtain a second channel descriptor, wherein the second channel descriptor is generated by the wireless communication device based on the second sounding packet. The controller is also configured to generate, based on the first channel descriptor and the second channel descriptor, calibration coefficients indicative of one or both of (i) phase imbalance and (ii) amplitude imbalance between a receive radio frequency (RF) chain and a transmit RF chain at the wireless communication device. Additionally, the controller is configured to send the calibration coefficients from the controller to the wireless communication device.

DETAILED DESCRIPTION

While the beamforming techniques described herein for processing and effecting a wireless data transmission are described as being used in communication systems that use one of the IEEE Standard 802.11 communication standards (e.g., IEEE 802.11n), these techniques may be used in various other types of wireless communication systems and are not limited to those conforming to one or more of the IEEE Standard 802.11 standards. For example, these techniques may be used in communications based on the IEEE 802.16e, 802.16j, or 802.16m standards (known as "WiMAX") and others.

Figure 1:
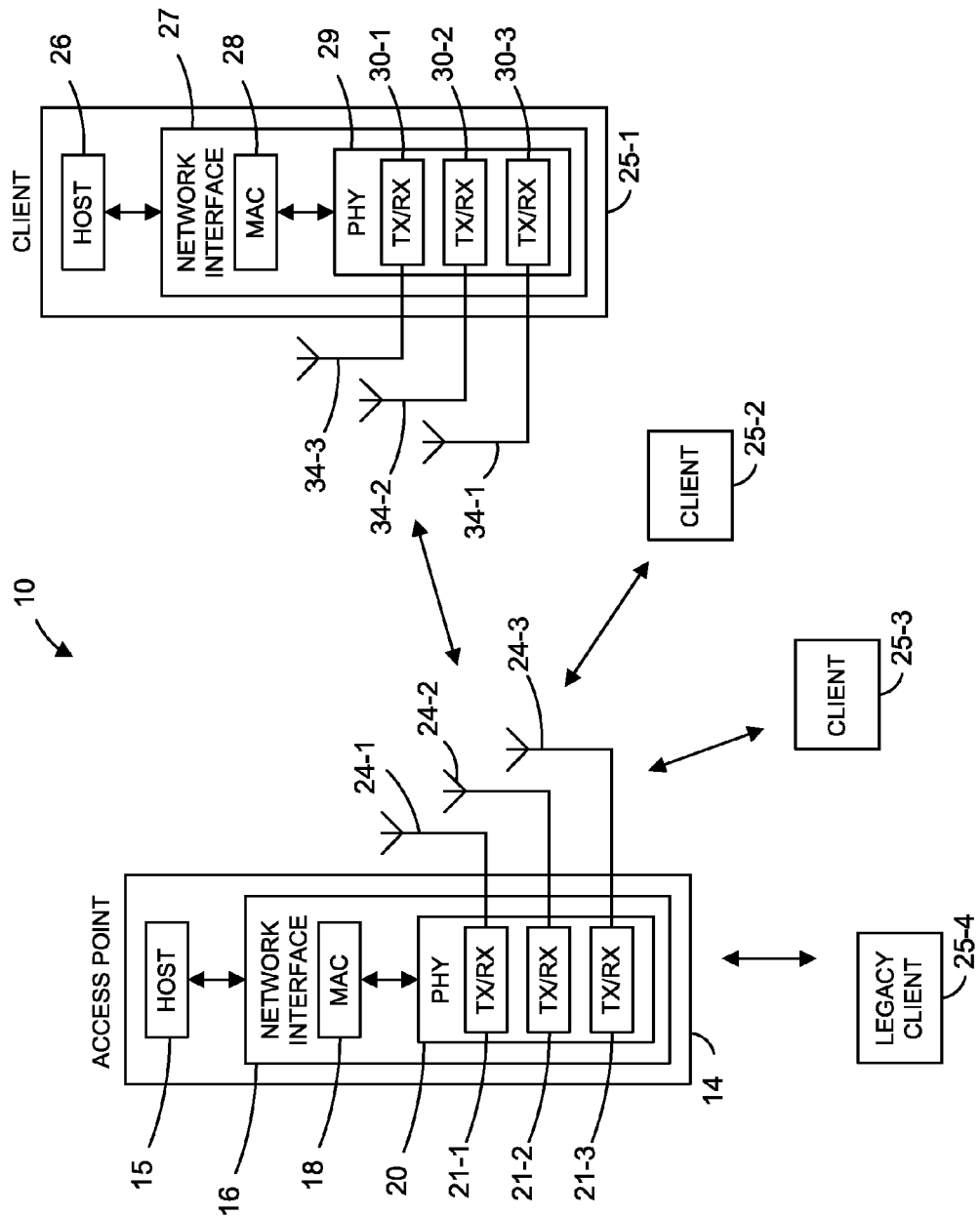
FIG. 1 is a block diagram of an example wireless local area network (WLAN) in which devices calibrated according to procedures set forth in the present disclosure are utilized, according to an embodiment.

FIG. 1 is a block diagram of an example wireless local area network (WLAN) 10 in which devices calibrated according to procedures set forth in the present disclosure are utilized, according to an embodiment. An access point (AP) 14 includes a host processor 15 coupled to a network interface 16. The network interface 16 includes a medium access control (MAC) processing unit 18 and a physical layer (PHY) processing unit 20. The PHY processing unit 20 includes a plurality of transceivers 21, and the transceivers 21 are coupled to a plurality of antennas 24. Although three transceivers 21 and three antennas 24 are illustrated in FIG. 1, the AP 14 includes different numbers (e.g., 1, 2, 4, 5, etc.) of transceivers 21 and antennas 24 in other embodiments. In one embodiment, the MAC processing unit 18 and the PHY processing unit 20 are configured to operate according to a first communication protocol (e.g., the IEEE 802.11n Standard) which supports certain frame exchanges and other procedures specifically related to explicit and/or implicit beamforming. In another embodiment, the MAC processing unit 18 and the PHY processing unit 20 are alternatively or additionally configured to operate according to a second communication protocol, which does not explicitly support beamforming (e.g., the IEEE 802.11g Standard, the IEEE 802.11a Standard, etc.). The second communication protocol is herein referred to as a "legacy protocol."

The WLAN 10 includes a plurality of client stations 25. Although four client stations 25 are illustrated in FIG. 1, the WLAN 10 includes different numbers (e.g., 1, 2, 3, 5, 6, etc.) of client stations 25 in various scenarios and embodiments. At least one of the client stations 25 (e.g., client station 25-1) is configured to operate at least according to the first communication protocol. The WLAN 10 also includes a client station 25-4 that is not configured to operate according to the first communication protocol but is configured to operate according to a legacy protocol, in some embodiments. Accordingly, the client station 25-1 does not explicitly support frame exchanges or other procedures specifically related to beamforming. Such a client station 25-4 is referred to herein as a "legacy client station." In some embodiments and/or scenarios, the WLAN 10 includes more than one legacy client station. In other embodiments and/or scenarios, the WLAN 10 includes no legacy client stations.

The client station 25-1 includes a host processor 26 coupled to a network interface 27. The network interface 27 includes a MAC processing unit 28 and a PHY processing unit 29. The PHY processing unit 29 includes a plurality of transceivers 30, and the transceivers 30 are coupled to a plurality of antennas 34. Although three transceivers 30 and three antennas 34 are illustrated in FIG. 1, the client station 25-1 includes different numbers (e.g., 1, 2, 4, 5, etc.) of transceivers 30 and antennas 34 in other embodiments.

In an embodiment, one or more of the client stations 25-2, 25-3, and 25-4 have a structure the same as or similar to the client station 25-1. In these embodiments, the client stations 25 which are structured the same as or similar to the client station 25-1 have the same or a different number of transceivers and antennas. For example, the client station 25-2 has only two transceivers and two antennas, according to an embodiment.

In an embodiment, the AP 14 utilizes implicit beamforming for communication with one or more of the client stations 25 in order to increase signal directivity and generally improve quality (e.g., SNR) of the signals received by the client stations. In implicit beamforming, the AP 14 determines the channel state information (CSI) or other measured description of the reverse channel (i.e., the channel from a particular client station, such as the client station 25-1, to the AP 14) from the training signal(s) sent from, for example, the client station 25-1 to the AP 14 thereby avoiding the multiple communications between the AP 14 and the client station 25-1 generally required in explicit beamforming. Further, according to an embodiment, the AP 14 utilizes implicit beamforming for communication with the client station 25-4 (a legacy client station) which does not support frame exchanges generally required for beamforming, according to an embodiment.

To conduct implicit beamforming, according to one embodiment, the AP 14 implements a "standard" implicit beamforming technique. In this embodiment, the AP 14 transmits to the client station 25-1 a data unit that includes a request to transmit a sounding frame that "sounds" the reverse channel from the client station 25-1 to the AP 14 thereby allowing the AP 14 to fully determine or estimate characteristics of the reverse channel (e.g., to determine CSI or other measured description of the reverse channel). The AP 14 then computes an estimate of the forward channel (i.e., the channel from the AP 14 to the client station 25-1) based on the estimate of the reverse channel by assuming channel reciprocity and, based on the forward channel estimate, generates a steering matrix specifying the beamsteering coefficients that are then applied to the signals to be transmitted to the client station 25-1 to produce the desired transmit gain pattern at the transmitter output.

Alternatively, in another embodiment, the AP 14 conducts implicit beamforming by implementing a "non-standard" implicit beamforming. According to this embodiment, the AP 14 determines an estimate of the reverse channel based on a data unit received from the client station 25-1, wherein the received data unit is not specifically related to beamforming (e.g., a non-sounding data unit, also referred to herein as a "regular" data unit). More specifically, in this embodiment, the AP 14 receives from the client station 25-1a regular data unit that does not specifically sound the channel but nonetheless includes training signals (e.g., in a preamble) that allow the AP 14 to determine or estimate characteristics of the reverse channel. Similar to the case of standard implicit beamforming, the AP 14 then computes an estimate of the forward channel from the estimate of the reverse channel by assuming channel reciprocity, and, based on the forward channel estimate, computes a steering matrix to be used for beamforming in the direction of the client station 25-1, according to an embodiment.

Figure 2:
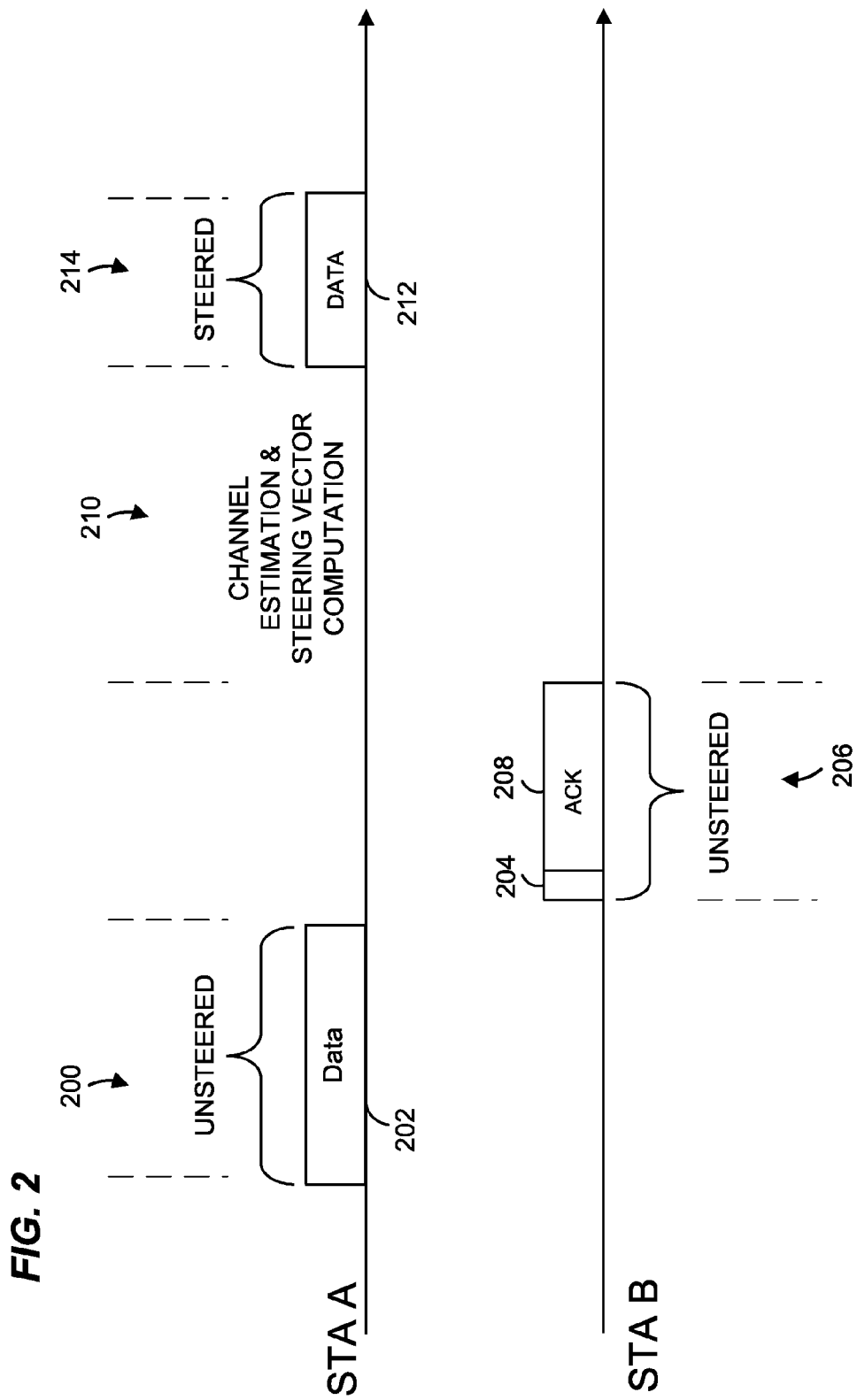
FIG. 2 is a diagram illustrating a specific example of a non-standard implicit beamforming technique, according to an embodiment.

FIG. 2 is a diagram illustrating one specific example of a non-standard implicit beamforming technique, according to an embodiment. In FIG. 2, Station A is a "beamformer" or a device that transmits or will transmit a data unit using a steering matrix, and Station B is a "beamformee" or a device that receives a data unit transmitted using a steering matrix. Referring to FIG. 1, according to one embodiment, the AP 14 is the beamformer, and the client station 25-1 is the beamformee. In another embodiment, the client station 25-1 is the beamformer, and the AP 14 is the beamformee.

During a time interval 200, Station A transmits an unsteered data unit 202 (i.e., a data unit that is transmitted omni-directionally (as used herein, the term "omni-directional" encompasses the term "pseudo-omni-directional")) to Station B. In an embodiment, the data unit 202 includes an acknowledge (ACK) request that instructs the Station B to transmit an ACK frame upon successful reception of the data unit 202. Accordingly, in response to receiving the data unit 202, Station B transmits an ACK frame 208 to the Station A, wherein the ACK frame includes several training signal fields in a portion 204. In particular, as each training field is transmitted, Station B applies a different mapping of symbols to spatial streams, according to an embodiment. In an embodiment, the number of training fields corresponds to the number of spatial streams used for modulating data units transmitted from Station B to Station A which depends on the particular modulation and coding scheme (MCS) used for communication between Station A and Station B.

During a time interval 210, Station A estimates the MIMO channel in the direction from Station B to Station A (i.e., the reverse channel) based on the training fields of the received ACK frame 208. Station A then generates an estimate of the forward channel using the estimate of the reverse channel and generates a steering matrix for use in forward channel transmissions. As illustrated in FIG. 2, during a time period 214, Station A transmits a data unit 212 using the steering matrix generated in the interval 210.

In some embodiments, the non-sounding data frame used by the Station A to estimate the reverse channel is a data unit other than an ACK frame or a negative acknowledgement (NACK) frame, i.e., a frame that acknowledges successful receipt of a previous frame, or a frame that indicates unsuccessful receipt of a previous frame, respectively. For example, the non-sounding data frame used by the Station A to estimate the reverse channel is a data unit that carries user data, in some embodiments and/or scenarios, Generally, Station A utilizes any suitable non-sounding data unit received from Station B to generate an estimate of the reverse channel as long as the received data unit includes at least one training signal, in various embodiment and/or scenarios.

Referring again to FIG. 1, in one embodiment, the AP 14 implements a non-standard implicit beamforming technique when communicating with a legacy client station (e.g., client station 25-4) that does not support certain procedures required for standard explicit or implicit beamforming. For example, the client station 25-4 is not configured to process a request to transmit a sounding frame, according to some embodiments. In some such embodiments, the regular data unit used to estimate the reverse channel includes training data that allows the AP 14 to only partially estimate the reverse channel. In one such embodiment, for example, the client station 25-4 includes three antennas but transmits a data unit to the AP 14 via only two of the antennas (i.e., via two spatial streams). This data unit, therefore, includes training signals that allow the AP 14 to only determine a partial channel estimate (in this case at most a two-dimensional channel estimate). In this embodiment, the AP 14 then utilizes the partial channel estimate to generate a steering matrix which results in at least some channel directivity in the direction of the client station 25-4.

As discussed above, to conduct implicit beamforming, such as standard or non-standard implicit beamforming, the AP 14 assumes channel reciprocity to determine an estimate of the forward channel based on an estimate of the reverse channel, according to an embodiment. However, channel estimation is generally conducted at baseband, and therefore, the observed channel contains the equivalent RF responses of the transmit and the receive chains which, according to an embodiment, are not identical in the same device. In this embodiment, channel reciprocity is therefore impaired. To reduce or account for the errors introduced by RF chain impairments in an implicit beamforming technique, in one embodiment, the AP 14 applies a correction matrix to the signals to be transmitted (i.e., the output signals) during the beamforming process to compensate for measured differences between the actual forward and reverse channels. In particular, this technique first determines a correction matrix that at least partially compensates for RF impairments caused by transmit and receive chain imbalance in the communication device. Then, each time a new steering matrix is to be calculated for the forward channel, the beamforming technique applies the correction matrix to a steering matrix determined using a basic implicit beamforming technique, such as a standard or a non-standard implicit beamforming technique, so that, once the correction matrix is determined, the transmitter performs implicit beamforming using a measured description of the reverse channel to produce an estimate of the forward channel. Alternatively, in some embodiments, the transmitter calculates correction matrices for its receive chains, so that once the correction matrix is determined, the transmitter applies the correction matrices to the reverse channel estimation, and performs implicit beamforming using a measured description of this processed reverse channel estimate to produce an estimate of the forward channel. In an embodiment, the calibration procedure is conducted infrequently, compared with steering matrix updates. For example, in one embodiment, the calibration procedure is conducted only prior to deployment of a device, for example during manufacturing of the device (or of a relevant portion of the device), and the determined correction matrix is then stored in a memory of the device to be later used to compensate for RF chain imbalance when implicit beamforming is performed by the device.

Referring to FIG. 1, in mathematical terms, the channel between the AP 14 (Station A) and a client station such as, for example, the client station 25-1 (Station B) is generally characterized by:

$$y_B = \tilde{H}_{AB} Q_A x_A + n_B, \quad \text{(Equation 1)}$$

where $y_B$ and $n_B$ are the received signal vector and additive noise vector at Station B, respectively; $\tilde{H}_{AB}$ is the equivalent channel from Station A to Station B; $x_A$ is the signal vector to be transmitted from Station A; and $Q_A$ is the steering matrix (which may be a vector) at Station A. In various embodiments and/or scenarios, the steering matrix $Q_A$ is determined based on the current channel state information (CSI) for the channel between Station A and Station B. For example, the steering matrix $Q_A$ is determined using an explicit beamforming technique or an implicit beamforming technique such as described above in various embodiments and/or scenarios.

As discussed above, in implicit beamforming techniques, the AP 14 determines an estimate for the forward channel based on an estimate of the reverse channel under the assumption of channel reciprocity. In the case of time-division duplexing (TDD), the forward link and the reverse link share the same frequency band, so their physical propagation channels, denoted as $H_{AB}$ and $H_{BA}$ respectively, can be assumed reciprocal ($H_{AB} = H_{BA}^T$), if the channel is varying slowly compared to the interval between forward and reverse link transmissions. Further, in the case of an orthogonal frequency division multiplexing (OFDM) system, according to an embodiment, channel estimation is conducted for each subcarrier, or for a group of adjacent subcarriers, and channel reciprocity is assumed for the forward and the reverse channels at each subcarrier frequency.

However, as discussed above, the actual channels observed at baseband also include the equivalent RF responses of the transmit and receive chains, which is not identical for the transmit and receive chains in the same device, according to some embodiments. In these embodiments, this imbalance results in the equivalent channels $\tilde{H}_{AB}$ and $\tilde{H}_{AA}$ not being reciprocal. In an embodiment, the mathematical description of this imbalance issue is represented as:

$$\tilde{H}_{AB} = C_{B,Rx} H_{AB} C_{A,Tx}, \quad \text{(Equation 2)}$$

where $C_{B,Rx}$ represents the RF responses at the receive chains of Station B; and where $C_{A,Tx}$ represents the RF responses at the transmit chains of Station A. By ignoring the coupling among transmit and receive chains, the matrices $C_{B,Rx}$ and $C_{A,Tx}$ are approximately modeled, in an embodiment, as diagonal matrices.

The equivalent channel from Station B to Station A, $\tilde{H}_{BA}$, according to an embodiment, is represented as:

$$\tilde{H}_{BA} = C_{A,Rx} H_{AB}^T C_{B,Tx}, \quad \text{(Equation 3)}$$

Due to imbalances between the transmit and receive chains at Station A and at Station B, respectively, i.e., $C_{A,Tx} \neq C_{A,Rx}^T$ and/or $C_{B,Tx} \neq C_{B,Rx}^T$, it stands that $\tilde{H}_{AB} \neq \tilde{H}_{BA}^T$.

In some embodiments, one or both devices compensate the transmit and/or the receive RF imbalance at baseband. For example, one or more correction matrices are calculated and then multiplied with the transmitted or received signal vector in the baseband to correct the imbalance and maintain reciprocity between the transmit and receive channels, according to some embodiments and/or scenarios. For example, in one embodiment, a transmitter-side correction matrix $K_{A,Tx}$ and a receiver-side correction matrix $K_{B,Rx}$ are calculated such that they completely compensate for the imbalance. Thus, in this embodiment, a corrected equivalent channel from Station A to Station B $\hat{H}_{AB}$ is then represented as:

$$\hat{H}_{AB} = K_{B,Rx} \tilde{H}_{AB} K_{A,Tx} = \alpha \tilde{H}_{BA}^T, \quad \text{(Equation 4)}$$

where $\alpha$ is a scalar. Equation 4 is indicative of a "strict reciprocity system", i.e., a system that offers full calibration at both the transmitter and receiver. To implement a strict reciprocity system, in an embodiment, Station A left-multiplies the correction matrix $K_{A,Tx}$ with the signal it is to transmit ($Q_A x_A$) at baseband. Also, in this embodiment, upon receiving the signal, Station B left-multiplies the correction matrix $K_{B,Rx}$ with the received signal at baseband.

Alternatively, in another embodiment, only transmitter-side compensation is utilized. In this embodiment, $\hat{H}_{AB}$ is represented as, for example:

$$\hat{H}_{AB} = \tilde{H}_{AB} K_{A,Tx} = D_B \tilde{H}_{BA}^T, \quad \text{(Equation 5)}$$

where $D_B$ is a diagonal matrix representing the RF imbalance at Station B. Equation 5 is therefore indicative of a "semi-reciprocal system", in this case, because it offers partial calibration, or calibration only on the transmitter side. To implement a semi-reciprocal system, Station A left-multiplies the correction matrix $K_{A,Tx}$ with the signal it is to transmit ($Q_A x_A$) at baseband, according to an embodiment. Upon receiving the signal, in this embodiment, Station B does not apply a correction matrix, such as the correction matrix $K_{B,Rx}$, with the received signal.

In some embodiments, the transmitter-side compensation is also applied at the receiver chains of the same device. That is, in these embodiments, to realize semi-reciprocity, Station A left-multiplies the correction matrix $K_{A,Rx}$, with the reverse channel estimates at baseband:

$$\hat{H}_{BA} = K_{A,Rx} \tilde{H}_{BA} \quad \text{(Equation 6)}$$

$$\hat{H}_{AB} = D_B \tilde{H}_{BA}^T \quad \text{(Equation 7)}$$

where $K_{A,Rx} = \text{inv}(K_{A,Tx})$. Similar to Equation 5, $D_B$ in Equation 7 is a diagonal matrix representing the RF imbalance at station B.

Further, in some embodiments, the gain mismatch between the receive and the transmit RF chains is small, and RF imbalance compensation is accomplished by only compensating for the phase imbalance. Accordingly, in one such embodiment in which compensation is performed on the transmit side, $\hat{H}_{AB}$ is then expressed as:

$$\hat{H}_{AB} = \tilde{H}_{AB} K_{A,TX} = \tilde{H}_{AB} \begin{bmatrix} e^{j\theta_1} & & & \\ & e^{j\theta_2} & & \\ & & \ddots & \\ & & & e^{j\theta_N} \end{bmatrix} \quad \text{(Equation 8)}$$

Figure 3:
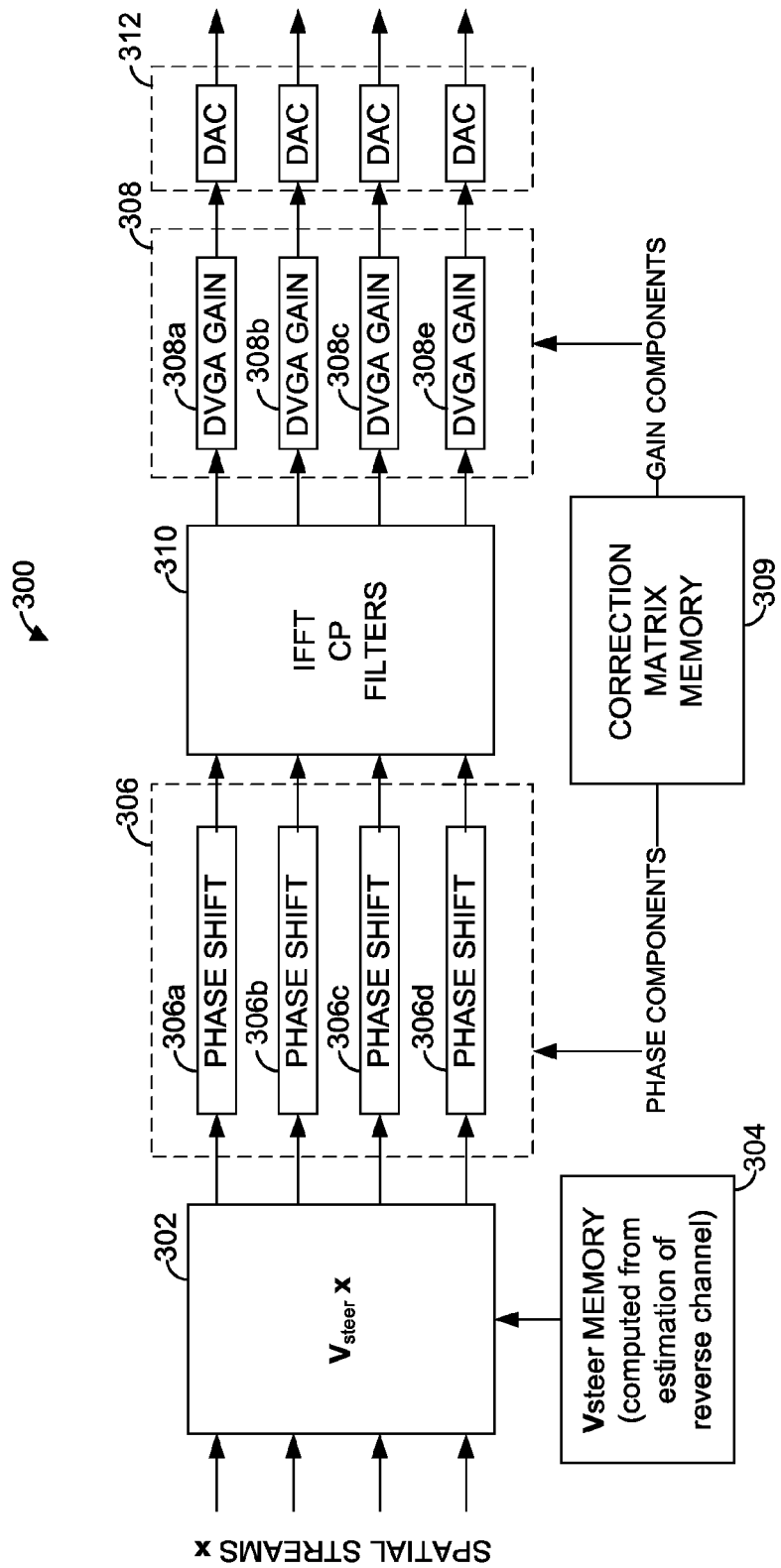
FIG. 3 is a beamsteering unit used to apply a steering matrix and the determined correction matrix to the forward and/or reverse channels in a multi-carrier system, according to an embodiment.

FIG. 3 is a diagram of a beamsteering unit 300 used to apply a steering matrix and the determined correction matrix to the forward and/or reverse channels in a multi-carrier system (e.g., as defined in the IEEE 802.11n Standard or any other multi-carrier based communication protocol), according to an embodiment. Referring to FIG. 1, the AP 14 and the client station 25-1, in one embodiment, each include a beamsteering unit such as the beamsteering unit 300. In the description below, the AP 14 is a beamformer (Station A) and the client station 25-1 is a beamformee (Station B). In some embodiments, however, the client station 25-1 is the beamformer and the AP 14 is the beamformee.

The spatial streams, x, are provided to a beamsteering matrix controller 302 (controller 302), which applies the computed steering matrix $V_{steer}$ (beamsteering matrix $V_{steer}$), computed as discussed above and stored in a memory 304. When compensating only the phase differences among the antennas on the Station A, the controller 302 provides output signals to a phase correction stage 306 (stage 306), which then applies different phase shifts for each of the output signals, as determined by a correction matrix ($K_{A,Tx}$) stored in a memory 309, e.g., by using only phase components of the correction matrix. In some embodiments, the correction matrix is expressed in terms of gain and phase, whereas in other embodiments the correction matrix is expressed only in terms of phase. In an embodiment, the stage 306 is implemented by different phase shifter stages 306a-306d, one for each transmitter chain.

In the illustrated embodiment, correction of the phase shift is determined in the frequency domain. The correction occurs at the transmitter of Station A, as shown, or in other examples, at the receiver of Station B. At the transmitter side, according to an embodiment, the correction is performed on each subcarrier at each transmitter chain, after the beamsteering matrix, $V_{steer}$, has been applied to the spatial stream, x.

In some embodiments, Station A also compensates for gain mismatches, by using a gain correction stage 308 implemented, for example, using a digital variable gain amplifier (DVGA). The stage is implemented by different DVGA gain stages 308a-308d, one for each transmit chain, in the illustrated example. In an embodiment, the gain correction stage applies digital gain with correction values, from the correction matrix, $K_{A,Tx}$ to each transmitter chain, where the corresponding matrix multiplication is done in the time domain. In the illustrated example, a processor 310 includes an inverse discrete Fourier transform calculator, e.g., an inverse fast Fourier transform (IFFT) calculator, that converts the phase corrected signal of stage 306 from the frequency domain to the time domain for the gain correction stage 308. Additionally, the processor 310 includes a cyclic prefix (CP) inserter to insert a CP in OFDM symbols to be transmitted. In some embodiments, the processor 310 also includes one or more filters. A corresponding digital-to-analog converter (DAC) 312 generates the corrected signal stream for transmission via a corresponding antenna of Station A.

In some configurations, a MIMO-OFDM transmitter applies time domain cyclic delay diversity (TCDD) after the IFFT and CP insertion performed by the processor 310 on the transmit signals. In some calibration procedures, the Station A turns OFF the TCDD function whenever sending a calibration initiation (e.g. sounding) packet and whenever Station A transmits the steered data packets determined using an implicit beamforming technique. If Station A does not turn OFF TCDD, then in other embodiments and/or scenarios Station A manually applies the TCDD effects (i.e., linear phase shifts across sub-carriers) in the frequency domain of the channel estimations on the packets of the reverse channel.

Figure 4:
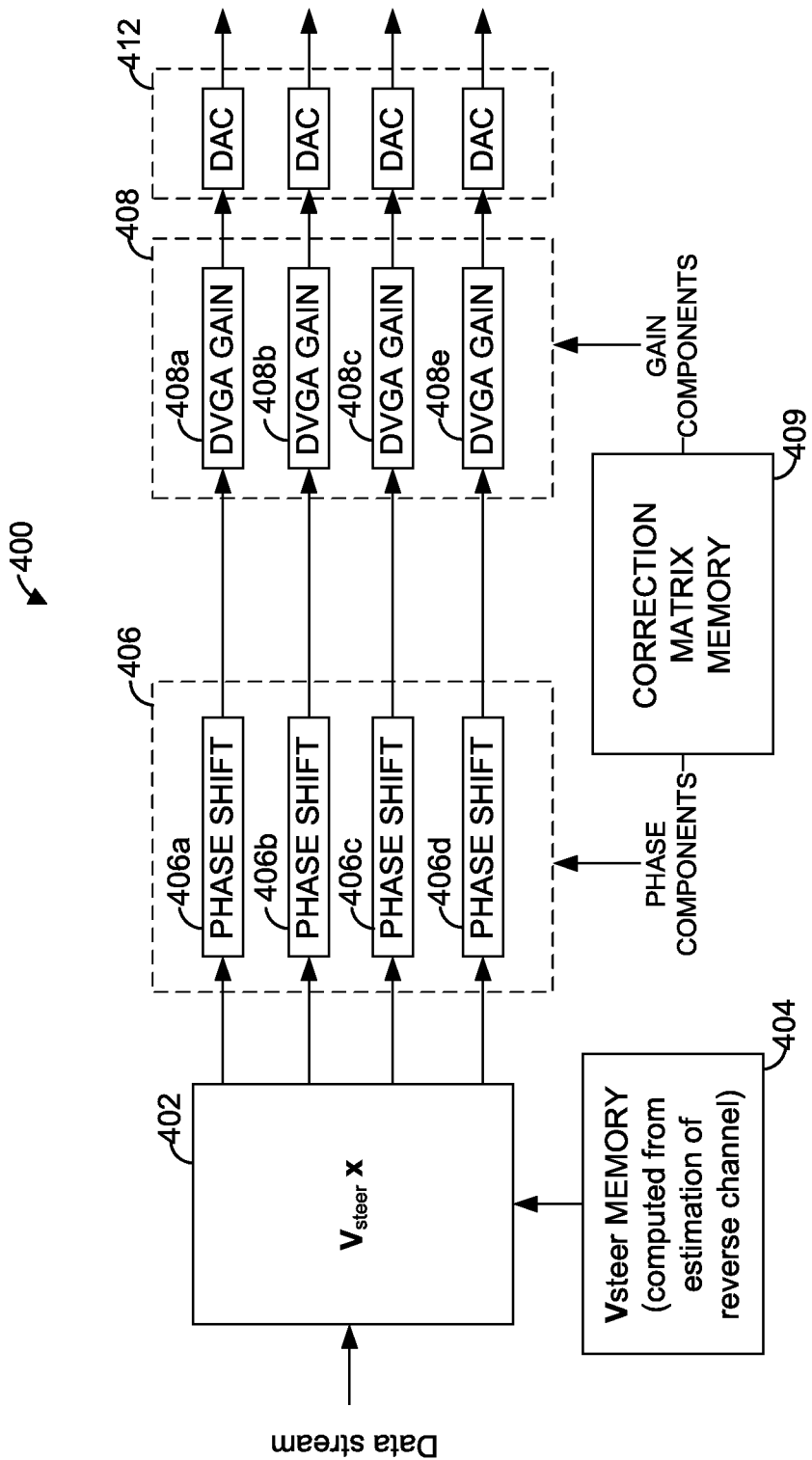
FIG. 4 is a diagram of another beamsteering unit used to apply a steering matrix and the determined correction matrix to the forward and/or reverse channels in a single carrier system, according to another embodiment.

FIG. 4 is a diagram of another example beamsteering unit 400 used to apply a steering matrix and the determined correction matrix to the forward and/or reverse channels in a single carrier system (e.g., as defined by the IEEE 802.11b Standard or any other single-carrier based communication protocol), according to another embodiment. Referring to FIG. 1, the AP 14 and the client station 25-1, in one embodiment, each include a beamsteering unit such as the beamsteering unit 400. In the description below, the AP 14 a beamformer (Station A) and the client station 25-1 is a beamformee Station B. In some embodiments, however, the client station 25-1 is the beamformer and the AP 14 is the beamformee.

The beamsteering unit 400 is similar to the beamsteering unit 300 of FIG. 3 except that in the beamsteering unit 400 the beamsteering matrix $V_{steer}$ is applied to a single-carrier data stream. Accordingly, in the beamsteering unit 400, a phase shift correction is applied in the time domain rather than the frequency domain. The time-domain correction occurs at the transmitter of Station A, as shown, or in other examples, at the receiver of (Station B). At the transmitter side, the correction is performed at each transmitter chain, after the beamsteering matrix $V_{steer}$, has been applied to the spatial stream, x.

Similar to operation of the beamsteering unit 300 of FIG. 3, in the beamsteering unit 400, the spatial streams, x, are provided to a beamsteering matrix controller 402 (controller 402), which applies the computed steering matrix $V_{steer}$, (beamsteering matrix $V_{steer}$), computed as discussed above and stored in a memory 404. When compensating only the phase differences among the antennas on the Station A, the controller 402 provides output signals to a phase correction stage 406 (stage 406), which then applies different phase shifts for each of the output signals, as determined by a correction matrix ($K_{A,Tx}$) stored in a memory 409, e.g., by using only phase components of the correction matrix. In some embodiments, the correction matrix is expressed in terms of gain and phase, whereas in other embodiments the correction matrix is expressed only in terms of phase. In an embodiment, the stage 406 is implemented by different phase shifter stages 406a-406d, one for each transmitter chain.

In some embodiments, Station A also compensates for gain mismatches, by using a gain correction stage 408 implemented, for example, using a digital variable gain amplifier (DVGA). The stage is implemented by different DVGA gain stages 408a-408d, one for each transmit chain, in the illustrated example. The gain correction stage applies digital gain with correction values, from the correction matrix, $K_{A,Tx}$, to each transmitter chain, where the corresponding matrix multiplication is done in the time domain, according to an embodiment. A corresponding DAC 412 generates the corrected signal stream for transmission via a corresponding antenna of Station A.

Figure 5:
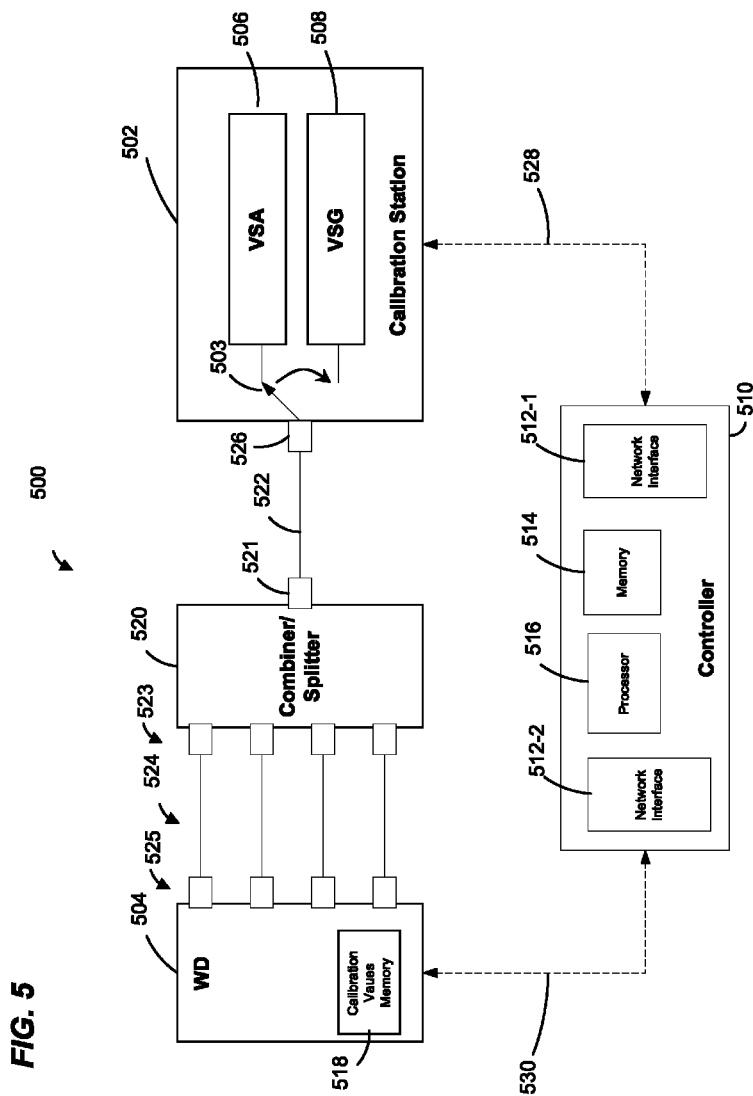
FIG. 5 is a diagram of a calibration system for calibrating a wireless device, according to an embodiment.

FIG. 5 is a diagram of a calibration system 500 for calibrating wireless device, such as a wireless device (WD) 504, according to an embodiment. The calibration system 500 includes a calibration station 502 and a controller 510. In an embodiment, the calibration station 502 is a MIMO test system capable of generating and analyzing signals conforming to one or more communication standards. The calibration station 502 includes one or several input/output ports 526. Depending on the operating mode of the calibration station 502, each of the input/output ports 526 transits or receives communication signals conforming to a certain communication protocol, such as an IEEE-802.11 Standard or an IEEE 802.16 Standard, for example. While for simplicity the calibration station 502 is illustrated as having a single input/output port 526 connected to a single cable 522, the calibration station 502 includes two or more input/output ports 526 connected to a corresponding number of cables 522 in other embodiments. Further, in some embodiments, the calibration station 502 is configured for wireless transmission and reception of communication signals. Although in embodiments in which the calibration station 502 is configured for wired transmission the input/output ports 526 are not connected to actual antennas, the input/output ports 526 are sometimes referred to herein as "antenna ports," for ease of explanation. The wireless device 504 includes a plurality of input/output ports (or "antenna ports") 525, according to an embodiment.

As shown in FIG. 5, in an embodiment, the calibration system 500 includes the wireless device 504 being calibrated using the calibration system 500. Referring to FIG. 1, the wireless device 504 corresponds to the AP 14 or a portion of the AP 14, such as the network interface 16 or the PHY processing unit 20 of the AP 14, for example, in some embodiments. With continued reference to FIG. 1, in some embodiments, the wireless device 504 corresponds to the client station 25-1 or a portion of the client station 25-1, such as the network interface 27 or the PHY processing unit 29 of the client station 25-1, for example. In other embodiments, the wireless device 504 corresponds to another suitable multiple antenna wireless communication device. The wireless device 504 includes a plurality of input/output ports (or "antenna ports") 525 corresponding to the multiple antennas of the device. In an embodiment, the wireless device 504 includes a calibration coefficient memory 518. According to an embodiment, the calibration coefficient memory 518 is used to store the calibration coefficients determined by the calibration system 500 and is subsequently used by the wireless device 504 for RF chain imbalance compensation in an implicit beamforming technique. The calibration coefficient memory 518 corresponds to the memory 309 of FIG. 3, or the memory 409 of FIG. 4, in some embodiments.

One or more combiner/splitter units 520 are provided to connect multiple antenna ports of the wireless device 504 to one or more antenna ports of the calibration station 502, in various embodiments and/or scenarios. In the embodiment of FIG. 5, the calibration system 500 includes a single splitter/combiner unit 520 to connect four antenna ports 525 of the wireless device 504 to the single antenna port 526 of the calibration station 502. The combiner splitter/combiner unit 520 includes a sum port 521 and four input/output ports 523. Each of the input/output ports 523 is connected to an antenna port 525 of the wireless device 504 via a corresponding number of cables 524. As illustrated, in the embodiment of FIG. 5, the splitter/combiner unit 520 is a four way splitter/combiner having four input/output ports 523. Accordingly, in this embodiment, the calibration system 500 is capable of calibrating a wireless device 504 having a maximum of four antenna ports 525. In other embodiments, the splitter/combiner unit 520 includes any other suitable numbers (e.g., 2, 3, 5, 6, 7, 8, etc.) of input/output ports 521. As an example, in an embodiment, the splitter/combiner 520 is a two-way splitter/combiner having two input/output ports 523. Accordingly, in this embodiment, the calibration system 500 is capable of calibrating a wireless device 504 having a maximum of two antennas (or antenna ports 525). As another example, in another embodiment, the splitter/combiner unit 520 is an eight way splitter/combiner and, in this embodiment, the calibration system 500 is capable of calibrating a wireless device 504 having a maximum of eight antennas (or antenna ports 525). Further, in embodiments in which the calibration station 502 includes multiple antenna ports 526, an additional splitter/combiner unit is provided to split the output of the splitter/combiner unit 520 among the multiple antenna ports of the calibration station 502.

In embodiments in which the wireless device 504 communicates with the calibration station 502 via a wireless communication link, the combiner/splitter unit 520 is omitted from the calibration system 500.

In the embodiment of FIG. 5, the calibration station 502 includes a vector signal analyzer (VSA) 506 and a vector signal generator (VSG) 508. In an embodiment, the VSA 506 receives and captures signals from the wireless device 504 when the calibration station 502 operates in a receive mode, and the VSG 508 transmits signals to the wireless device 504 when the calibration when the calibration station 502 operates in a transmit mode. To this end, in one embodiment, a switch 503 directs signals from the sum port 521 of the splitter/combiner unit 520 to an input port of the VSA 506 when the calibration station 502 is operating in a receive mode, or to an output port of the VSG 508 when the calibration station 502 is operating in a transmit mode, according to an embodiment. In an embodiment, the position of the switch 503 is controlled by the controller 510, for example. In some embodiments, the switch 503 is omitted, and the cable 522 is manually switched between the output of the VSA 506 in receive mode and the output port of the VSG 508 in transmit mode.

In various embodiments, the controller 510 includes one or more network interfaces 512 for communicating with the calibration station 502 and the wireless device 504. In the embodiment of FIG. 5, the controller 512 includes a network interface 512-1 configured to interface with the calibration station 502 via a communication link 528 and a network interface 512-2 configured to interface with the wireless device 504 via a communication link 530. Alternatively, in another embodiment, the network interface 512-1 and the network interface 512-2 are combined into a single network interface configured to interface with the calibration station 502 and the wireless device 504. In various embodiments and/or scenarios, the communication link 528 is an RS 232 link, an Ethernet link, a universal serial bus (USB) link, or any other suitable communication link with which the calibration station 502 is configured to interface. Similarly, the communication link 530 is an RS-232 serial link, an Ethernet link, a universal serial bus (USB) link, or any other communication link suitable for interfacing with the wireless device 504, according to various embodiments and/or scenarios. In one embodiment, the communication link 528 is a communication link separate from the communication link 530. In another embodiment, the communication link 528 is the same communication link as the communication link 530.

In an embodiment, the controller 510 includes a memory 514 and a processor 516. In operation, the controller 510 obtains, from the calibration station 502, information indicative of the communication channel from the WD 504 to the calibration station 502 ("forward" communication channel with respect to the WD 504) and stores the forward channel information in the memory 514, according to an embodiment. The controller 510 also obtains, from the WD 504, information indicative of the communication channel from the calibration station 502 to the WD 504 ("reverse" communication channel with respect to the WD 504) and stores the reverse channel information in the memory 514. Then, based on the forward channel information obtained from the calibration station 502 and the reverse channel information obtained from the wireless device 504, the processor 516 calculates calibration coefficients indicative of phase and/or amplitude imbalance between receive and transmit RF chains corresponding to each antenna port 525 of the wireless device 504, according to an embodiment. In an embodiment, upon calculating calibration coefficients, the controller 510 communicates the calibration coefficients to the wireless device 504. The wireless device 504 stores the calibration coefficients calculated by the controller 510 in a calibration coefficient memory 518, according to an embodiment. The wireless device 504 subsequently utilizes the calibration coefficients stored in the calibration coefficient memory 518 when conducting implicit beamforming, for example when operating in the WLAN 10 of FIG. 1, in an embodiment.

Figure 6A:
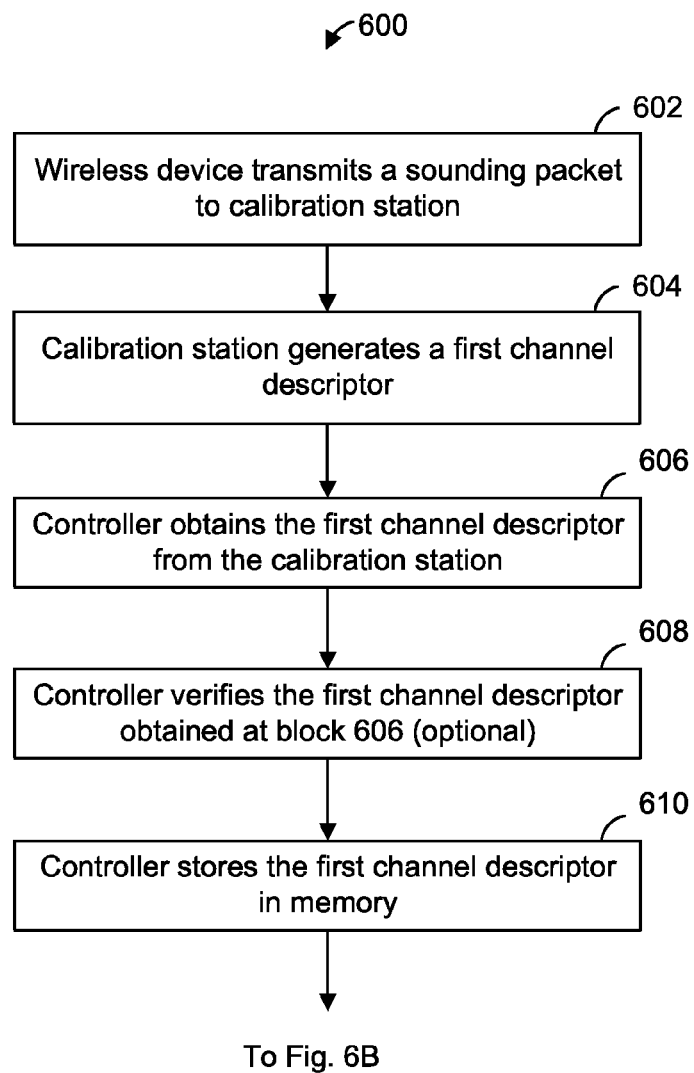
FIGS. 6A and 6B are flow diagrams illustrating an example calibration procedure conducted by a calibration system, according to an embodiment, FIG. 7, which is a timing diagram illustrating communications between a wireless device and a calibration station, according to an embodiment.
Figure 6B:
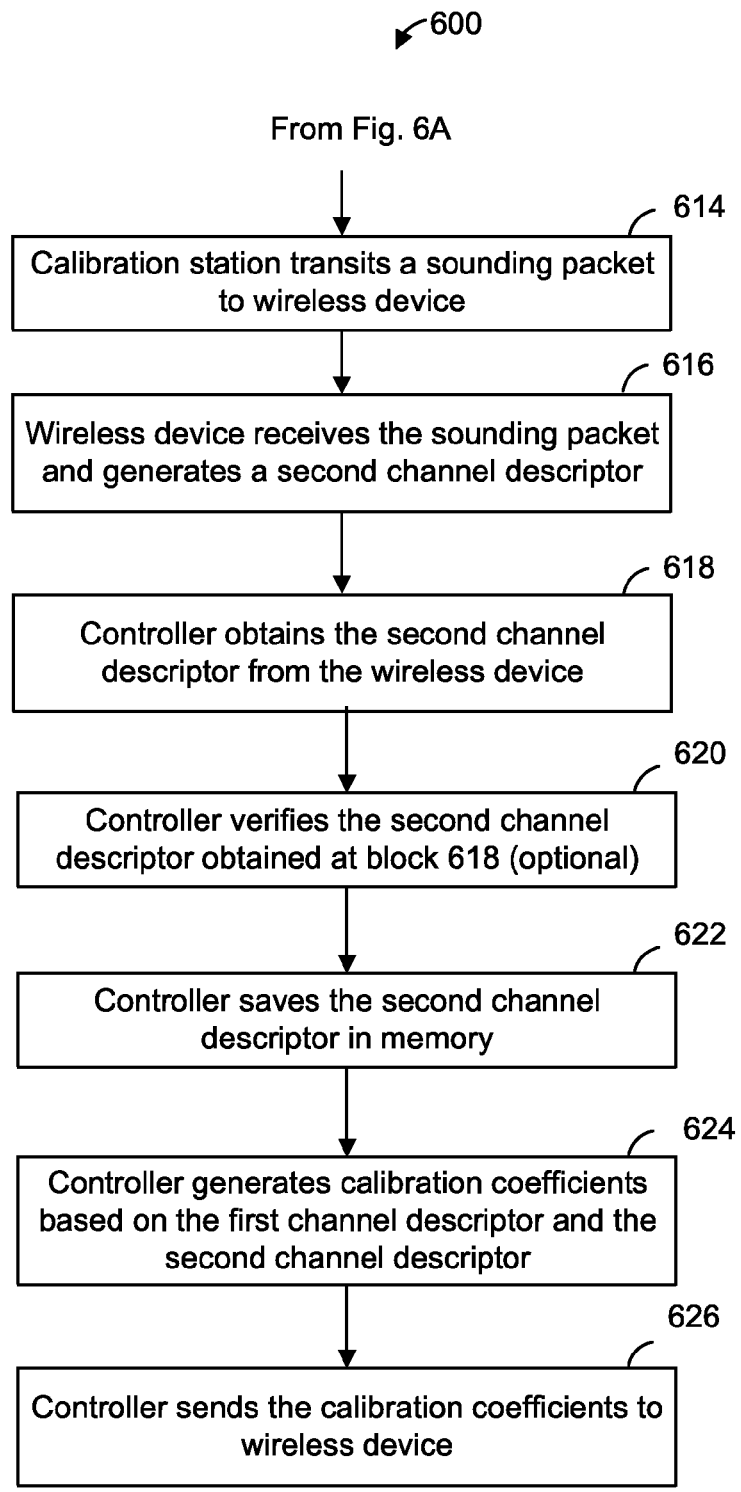

FIGS. 6A and 6B are a flow diagrams illustrating an example calibration procedure 600 conducted by a calibration system, such as the calibration system 500 of FIG. 5, according to an embodiment. The calibration procedure 600 will be described with reference to FIG. 7, which is a timing diagram illustrating communications between a wireless device (e.g., the wireless device 504) and a calibration station (e.g., the calibration station 502), according to an embodiment. In an embodiment, the controller 510 initiates the calibration procedure 600 by transmitting a calibration initiation command to the wireless device 504. In some embodiments, prior to transmitting the calibration initiation command, the controller 510 configures the calibration station 502 for receive mode operation. In one embodiment, for example, the controller 510 configures the calibration station 502 for receive mode operation by controlling the switch 503 to couple the antenna port 526 of the calibration station 502 to the VSA 506, and instructs the VSA 506 to capture any signals received by the VSA 506 during a certain period of time.

At block 602, the wireless device 504 transmits a sounding packet (e.g., a sounding packet 702) to the calibration station 502. In an embodiment, the sounding packet 702 is transmitted in response to a calibration initiation command that the WD 504 receives from the controller 510. The sounding packet 702 travels in the "forward" communication channel with respect to the wireless device 504, i.e., the communication channel from the wireless device 504 to the calibration station 502. The sounding packet 702 includes training information based on which the forward channel can be estimated. In an embodiment, the sounding packet 702 is a null data packet (NDP) sounding packet. In some embodiments, transmission of the sounding packet 702 is preceded by transmission of a sounding announcement packet, such as an NDP announcement (NDPA) packet 701.

At block 604, the calibration station 502 receives the sounding packet 702. The VSA 506 captures the sounding packet 702, and generates, based on the sounding packet 702, a channel descriptor indicative of the forward channel from the WD 504 to the calibration station 502. In an embodiment, the VSA 506 generates the channel descriptor at block 604 by generating in-phase/quadrature-phase (I/Q) samples corresponding to the captured sounding packet 702. In another embodiment, the VSA 506 generates the channel descriptor at block 604 by generating a channel estimation based on the captured sounding packet 702. In yet another embodiment, VSA 506 generates the channel descriptor at block 604 by generating a steering matrix based on the captured sounding packet 702. In general, the channel descriptor generated at block 604 includes any information indicative of the communication channel between the WD 504 and the calibration station 502.

At block 606, the calibration station 502 transmits the channel descriptor generated at block 604 to the controller 510. At block 606, the channel descriptor generated at block 604 is obtained by the controller 510. At block 608, the controller 510 verifies the channel descriptor obtained at block 606 to determine whether the channel descriptor is a valid channel descriptor, in some embodiments. If the controller 510 determines at block 610 that the channel descriptor received from the calibration station 502 at block 608 is not valid or contains errors, in an embodiment, blocks 602-606 are repeated, and the controller once again verifies validity of the channel descriptor at block 608. Blocks 602-606 are repeated until a valid channel descriptor is obtained, according to one embodiment. Alternatively, in some embodiments, blocks 602-606 are repeated a certain number of times (e.g., ten times) to generate multiple (e.g., 10) channel descriptors, and the controller 510 then selects a valid channel descriptor from the multiple channel descriptors, or averages the multiple channel descriptors to generate a new channel descriptor. In any event, at block 610, the controller 510 stores a first channel descriptor indicative of the forward channel from the WD 504 to the calibration station 502 in a memory, such as the memory 514, for example. In some embodiments, block 608 is omitted, and block 606 is directly followed by block 610, at which the channel descriptor obtained at block 606 is stored in memory.

Referring now to FIG. 6B, the calibration procedure 600 continues at block 614, at which the calibration station 502 transmits a sounding packet 704 to the WD 504. The sounding packet 702 travels in the "reverse" communication channel with respect to the wireless device 504, i.e., the communication channel from the wireless device 504 to the calibration station 502. The sounding packet 704 includes training information based on which the reverse communication channel can be estimated. In an embodiment, the sounding packet 704 is a null data packet (NDP) sounding packet. In some embodiments, transmission of the sounding packet 704 is preceded by transmission of a sounding announcement packet, such as an NDP announcement (NDPA) packet 703.

In an embodiment, prior to transmission of the sounding packet 704, the controller 510 configures the calibration station 502 for transmit mode. In one embodiment, for example, the controller 510 configures the calibration station 502 for transmit mode operation by controlling the switch 503 to couple the antenna port 526 of the calibration station 502 to the VSG 508. The controller 510 then controls the VSG 508 to transmit the sounding packet 704 and, in some embodiments, the sounding announcement packet 703.

The sounding packet 704 and the sounding announcement packet 703, in an embodiment, are generated to allow the WD 504 to conduct channel estimation in accordance with sounding procedures defined by the communication protocol being utilized for the calibration procedure 600. In some embodiments, the packets 703, 704 are generated externally with respect to the VSG 508. In one such embodiment, for example, a simulation software that simulates operation of the wireless device 504 is utilized. In another embodiment, a signal analyzer, such as the VSA 506 is used to capture a sounding packet and/or a sounding announcement packet generated by a reference wireless device, and the sounding packet 704 and/or the sounding announcement packet 703 is generated based on the corresponding captured packet. The reference wireless device is the wireless device 504, or a different wireless device configured to operate according to the communication protocol being utilized, in some embodiments. In any event, the packets generated externally with respect to the VSG 508, in an embodiment, are then provided to the VSG 508 (e.g., by providing I/Q samples corresponding to the sounding announcement packet 703 and/or the sounding packet 704) and used by the VSG 508 at block 614 to transmit the sounding packet to the WD 504. In some embodiments, the VSG 508 is capable of generating the packets 703, 704 internally, for example by using software provided with the VSG 508 (or with the calibration station 502) and in such embodiments, external generation of the packets 703, 704 is not required.

In some embodiments, the wireless device 504 is configured to receive and interpret a sounding packet only if the sounding packet is intended for the wireless device 504 and/or if the sounding packet is transmitted by a particular transmitting wireless device or devices, such as an access point or several access points with which the wireless device 504 is associated, as indicated by the preceding sounding announcements packet, for example. In such embodiments, the wireless device 504 discards the sounding packet 704 if the preceding announcement packet 703 does not include a particular device address (or particular device addresses).

Accordingly, to ensure that the WD 504 processes the sounding packet 704, the announcement packet 703 includes a physical address (e.g., a MAC address) associated with the wireless device 504 and/or a physical address (e.g., a MAC address) associated with the calibration station 502 (and/or with VSG 508). For example, the controller 510 configures the wireless device 504 with a particular MAC address, and provides this MAC address to the entity generating the announcement packet 703 for inclusion in the announcement packet 703. Similarly, the controller 510 configures the calibration station 502 (or the VSG 508) with a particular MAC address and configures the wireless device 504 to process sounding packets associated with the MAC address of the calibration station 502 (or the VSG 508). The controller 510 then provides the MAC address of the calibration station 502 (or the VSG 508), in addition to or instead of the MAC address associated with the wireless device 504, to the entity generating the announcement packet 703 for inclusion in the announcement packet 703.

At block 616, the WD 504 receives the sounding packet 704 and generates a channel descriptor of the reverse channel from the calibration station 502 to the wireless device 504. In one embodiment, the channel descriptor generated at block 616 includes I/Q samples of the sounding packet 704. In another embodiment, the channel descriptor generated at block 616 includes a channel estimation generated by the WD 504 based on the sounding packet 704. As another example, in another embodiment, the channel descriptor generated at block 616 includes a steering matrix generated by the WD 504 based on the sounding packet 704. In other embodiments, other suitable information indicative of the reverse channel from the calibration station 502 to the wireless device 504 is generated at block 616.

At block 618, the controller 510 obtains the channel descriptor generated at block 618 from the wireless device 504. In some embodiments, at block 620, the controller 510 verifies the channel descriptor received at block 618 to determine whether the channel descriptor is a valid channel descriptor. If the controller 510 determines at block 620 that the channel descriptor received from the calibration station 502 at block 618 is not valid or contains errors, in an embodiment, blocks 614-618 are repeated, and the controller once again verifies validity of the channel descriptor at block 620. The controller 510 repeats blocks 614-618 until a valid channel descriptor is received, according to an embodiment. Alternatively, in some embodiments, blocks 614-618 are repeated a certain number of times (e.g., ten times) to generate multiple (e.g., 10) channel descriptors, and the controller 510 then selects a valid channel descriptor from the multiple channel descriptors, or averages the multiple channel descriptors to generate a new channel descriptor. In any event, at block 622, the controller 510 stores a second channel descriptor indicative of the channel from the calibration station 502 to the WD 504 in the memory 514. In some embodiments, block 620 is omitted and the controller 510 simply stores the second channel descriptor obtained at block 618 in memory at block 622.

At block 624, based on the first channel descriptor stored in memory at block 610 and the second channel descriptor stored in memory at block 622, the controller 510 calculates calibration coefficients indicative of phase and/or amplitude imbalance between transmit and receive RF chains in the wireless device 504. In an embodiment, calibration coefficients calculated at block 624 correspond to elements of a correction matrix, such as, for example, the correction matrix $K_{A,Tx}$ or the correction matrix $K_{A,Rx}$ discussed above. Several example methods for calculating calibration coefficients, according to some embodiments, are discussed in greater detail below in connection with FIGS. 8-10 and Equations 9-21. At block 626, the controller sends calibration coefficients generated at block 626 are sent to the wireless device 504.

Figure 8:
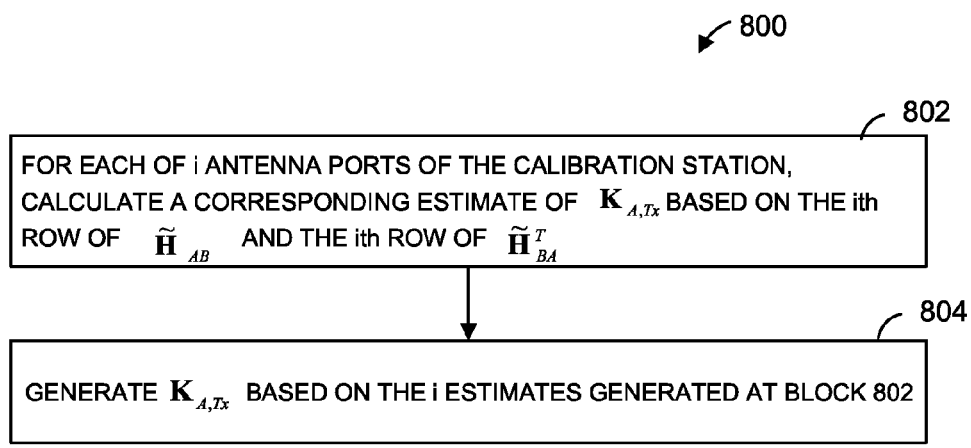
FIG. 8 is a flow diagram of an example method for generating calibration coefficients, according to an embodiment.

FIG. 8 is a flow diagram of an example method 800 for generating calibration coefficients based on an estimate of the forward channel $H_{AB}$, or the channel from the wireless device 504 to the calibration station 502, and an estimate of the reverse channel $H_{BA}$, or the channel from the calibration station 502 and the wireless device 504, according to an embodiment. In an embodiment, the controller 510 performs the method 800 to calculate calibration coefficients at block 624 (FIG. 6B). In this method, calibration coefficients correspond to elements of a diagonal matrix $K_{A,Tx}$.

At a block 802, for each port at the calibration station 502, a corresponding calibration coefficient corresponding to the i-th port of the wireless device 540 is calculated based on the i-th row in $\tilde{H}_{AB}$ and the i-th row in $\tilde{H}_{BA}{}^T$. The k-th element of the i-th row in $\tilde{H}_{AB}$ can be written as:

$$[\tilde{H}_{AB}]_{ki} = c_{B,Rx\_k}[H_{AB}]_{ik}c_{B,Tx\_i}, \quad \text{(Equation 9)}$$

Similarly, the k-th element of the i-th row of $\tilde{H}_{BA}{}^T$ is the k-th element of the i-th column of $\tilde{H}_{BA}$, which can be written as:

$$[\tilde{H}_{BA}]_{ki} = c_{A,Rx\_k}[H_{AB}]_{ik}c_{B,Tx\_i}, \quad \text{(Equation 10)}$$

The (k,k) element of the diagonal correction matrix $K_{A,Tx}$ corresponding to i is then determined as:

$$[K_{A,Tx}]_{kk} = \frac{[\tilde{H}_{BA}]_{ki}}{[\tilde{H}_{AB}]_{ik}} = \left(\frac{c_{B,Tx\_i}}{c_{B,Rx\_i}}\right)\frac{c_{A,Rx\_k}}{c_{A,Tx\_k}} = \alpha \frac{c_{A,Rx\_k}}{c_{A,Tx\_k}}, \quad \text{(Equation 11)}$$

where $$\alpha \frac{c_{B,Tx\_i}}{c_{B,Rx\_i}}, \quad \text{(Equation 12)}$$

Thus, for example, the (1,1) element of $K_{A,Tx}$ corresponding to i is determined as:

$$[K_{A,Tx}]_{11} = \frac{[\tilde{H}_{BA}]_{1i}}{[\tilde{H}_{AB}]_{i1}} = \left(\frac{c_{B,Tx\_i}}{c_{B,Rx\_i}}\right)\frac{c_{A,Rx\_1}}{c_{A,Tx\_1}} = \alpha \frac{c_{A,Rx\_1}}{c_{A,Tx\_1}}, \quad \text{(Equation 13)}$$

Similarly, the (2,2) element of $K_{A,Tx}$ corresponding to i is determined as:

$$[K_{A,Tx}]_{22} = \frac{[\tilde{H}_{BA}]_{2i}}{[\tilde{H}_{AB}]_{i2}} = \alpha \frac{c_{A,Rx\_2}}{c_{A,Tx\_2}}, \quad \text{(Equation 14)}$$

As can be seen from Equations 11-14, $\hat{H}_{AB} = \tilde{H}_{AB}K_{A,Tx} = \alpha c_{B,Rx}H_{AB}C_{A,Rx} = \alpha D_B \tilde{H}_{BA}{}^T$, where $D_B = C_{B,Rx}C_{B,Tx}{}^{-1}$, and the calibrated channels are semi-reciprocal.

At a block 804, the correction matrix $K_{A,Tx}$ is generated based on the i estimates generated at the block 802. As just one example, in one embodiment, the correction matrix $K_{A,Tx}$ is generated based on an average of the i estimates. For instance, in this embodiment, the (1,1) element is generated as an average of the i estimates of the (1,1) element generated at the block 804. Similarly, the (2,2) element is generated as an average of the i estimates of the (2,2) element generated at the block 804, etc.

In an embodiment, the controller 510 or the wireless device 504 calculates the correction matrix $K_{A,Rx}$ by inverting the correction matrix $K_{A,Tx}$. Alternatively, the correction matrix $K_{A,Rx}$ is calculated according to a method similar to the method 800 and equations similar to Equations 11 and 12, in some embodiments. In some such embodiments, the correction matrix $K_{A,Tx}$ is then calculated by inverting the correction matrix $K_{A,Rx}$.

In some examples, block 802 determines only the phase mismatch in calculating the correction matrix $K_{A,Tx}$ for example by averaging over different antenna index i or over different OFDM sub-carriers. In such examples, the correction matrix $K_{A,Tx}$ is expressed as a phase correction factor where the phase difference between the reverse estimation channel and the forward estimation channel is determined to provide the phase difference for each antenna port k of a wireless device (e.g., wireless device 504):

$$[K_{A,Tx}]_{kk} = \exp\{j < [\tilde{H}_{BA}]_{ki} - < [\tilde{H}_{AB}]_{ik})\}, \forall i \quad \text{(Equation 15)}$$

Figure 9:
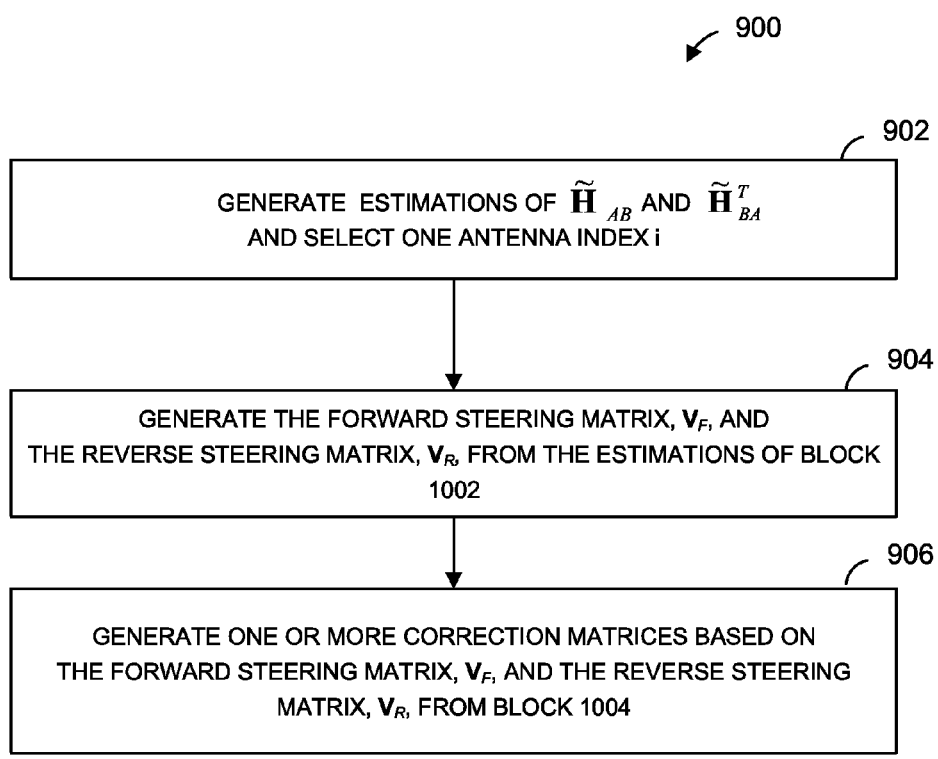
FIG. 9 is a flow diagram of an example method for generating calibration coefficients, according to another embodiment.

FIG. 9 is a flow diagram of another example method 900 for generating a correction matrix based on the estimation of the reverse channel $\tilde{H}_{BA}$ and the estimation of the forward channel $\tilde{H}_{AB}$, according to another embodiment. In an embodiment, the controller 510 performs the method 900 to calculate a correction matrix at block 624 (FIG. 6B). In this method, it is assumed that the correction matrix $K_{A,Tx}$ is a diagonal matrix.

Block 902 determines the singular matrixes that define the estimate of the forward channel $\tilde{H}_{AB}$ and the estimate of the reverse channel $\tilde{H}_{BA}$. A singular value decomposition (SVD) method or any other method or technique that determines a set of right singular matrixes that accurately describes or defines the forward channel $\tilde{H}_{AB}$ and another set of right singular matrixes that accurately describes or defines the estimate of the reverse channel $\tilde{H}_{BA}$ may be used. Or, in other examples, the estimate of the reverse channel $\tilde{H}_{BA}{}^T$ is determined from inverting the estimate of the forward channel $\tilde{H}_{AB}$. A block 904 then determines a forward steering matrix, $V_F$, using a method f, and a reverse steering matrix, $V_R$, using the same method f and computes the correction matrix using:

$$V_F = f(\tilde{H}_{AB}) \quad \text{(Equation 16)}$$

$$V_F = f(\tilde{H}_{BA}{}^T) \quad \text{(Equation 17)}$$

Block 906 then determines the correction matrix based on the determined forward and backward steering matrices, according to:

$$K_{A,Tx} = V_F V_R^H, \quad \text{(Equation 18)}$$

In some examples, the diagonal of the calculated correction matrix is made to correspond to pure phase shifts by normalization. For example, the block 906 may express the correction matrix with phase correction only by applying the mathematical formula:

$$K_{A,Tx} = \exp\{j < (V_F V_R^H)\} \quad \text{(Equation 19)}$$

While the foregoing describes determining the correction matrix $K_{A,Tx}$, the correction matrix $K_{A,Rx}$ can be calculated instead, e.g., by inverting the correction matrix $K_{A,Tx}$ determined using Equations 14, 15, 18, or 19. Alternatively, the correction matrix $K_{AR,x}$ is calculated first according to equations similar Equations 12-19. Then, the correction matrix $K_{A,Tx}$ is calculated by inverting the correction matrix $K_{A,Rx}$.

Figure 10:
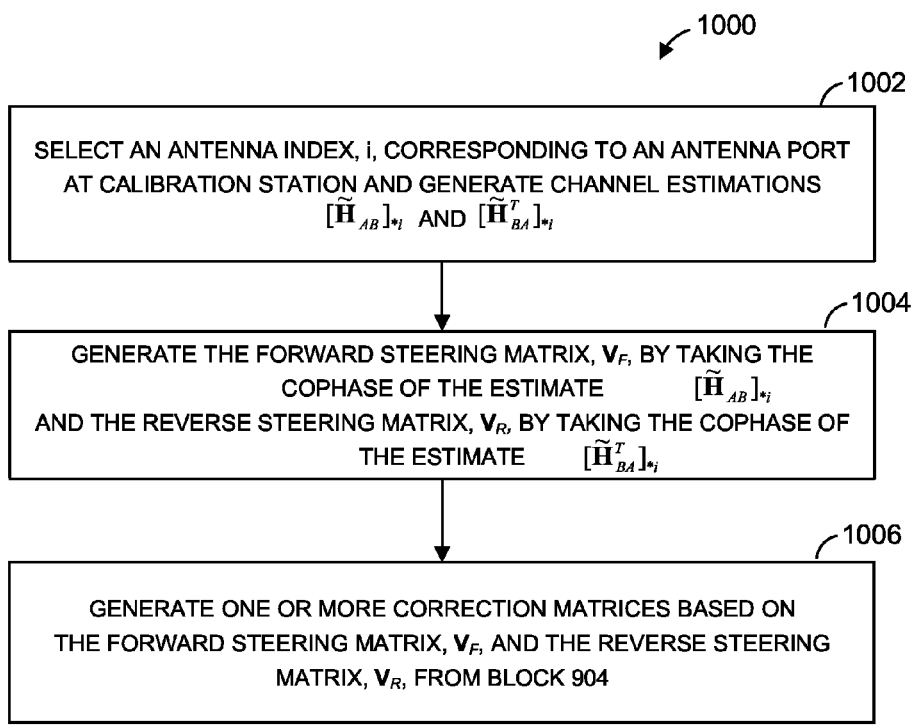
FIG. 10 is a flow diagram of an example method for generating calibration coefficients, according to yet another embodiment.

FIG. 10 illustrates an example approach 1000 to the method 900, and is achieved by the blocks 904 and 906 in FIG. 9, in some embodiments. Specifically, the block 904 determines the forward steering matrix, $V_F$, and the reverse steering matrix, $V_R$, using a cophasing technique. A block 1002 selects one antenna port index i corresponding to an antenna port of a calibration station (Station B). For example, the controller 510 selects the index i corresponding to the Station B antenna port with the strongest indicated channel gain from the estimation of the forward channel $\tilde{H}_{AB}$. In another example, the controller 510 selects the antenna port index i based on row averages. Block 1002 then generates partial estimations of forward and reverse channels $[\tilde{H}_{AB}]^*i$ and $[\tilde{H}_{BA}{}^T]^*i$, respectively.

With the generated partial estimates of the forward and reverse channels, block 1004 determines the forward steering matrix $V_F$ by taking a cophasing of the partial estimation $[\tilde{H}_{AB}]^*i$, as indicated by:

$$V_F = \text{cophase} \left([\tilde{H}_{AB}]_i^*\right) = \quad \text{(Equation 20)}$$

$$\text{cophase} \left([h_{i1}^{(F)} h_{i2}^{(F)} \cdots h_{iN_{Tx}}^{(F)}]\right) = \begin{bmatrix} e^{j\theta_{NTx1}} \\ e^{j\theta_{NTx2}} \\ \vdots \\ 1 \end{bmatrix}.$$

The block 1004 also determines the reverse steering matrix $V_R$ by taking a cophasing of the partial estimation $[\tilde{H}_{BA}{}^T]^*i$, as indicated by:

$$V_R = \text{cophase} \left(\tilde{H}_{BA}^T]_i^*\right) = \quad \text{(Equation 21)}$$

$$\text{cophase} \left([h_{i1}^{(R)} h_{i2}^{(R)} \cdots h_{iN_{Tx}}^{(R)}]\right) = \begin{bmatrix} e^{j\Psi_{NTx1}} \\ e^{j\Psi_{NTx2}} \\ \vdots \\ 1 \end{bmatrix}.$$

Because block 1002 identifies only a single receive antenna, the channel estimate is reduced to a single row, leaving each of $V_F$ and $V_R$ as linear matrices. Block 1006 produces the correction matrix $K_{A,Tx}$ by applying Equation 18, In this example approach, the correction matrix $K_{A,Tx}$ represents the phase difference between each of the corresponding forward and reverse steering matrices:

$$K_{A,Tx} = V_F V_R^H = \begin{bmatrix} e^{j(\theta_{NTx1} - \Psi_{NTx1})} & & & \\ & e^{j(\theta_{NTx2} - \Psi_{NTx2})} & & \\ & & \ddots & \\ & & & 1 \end{bmatrix}$$

Figure 11:
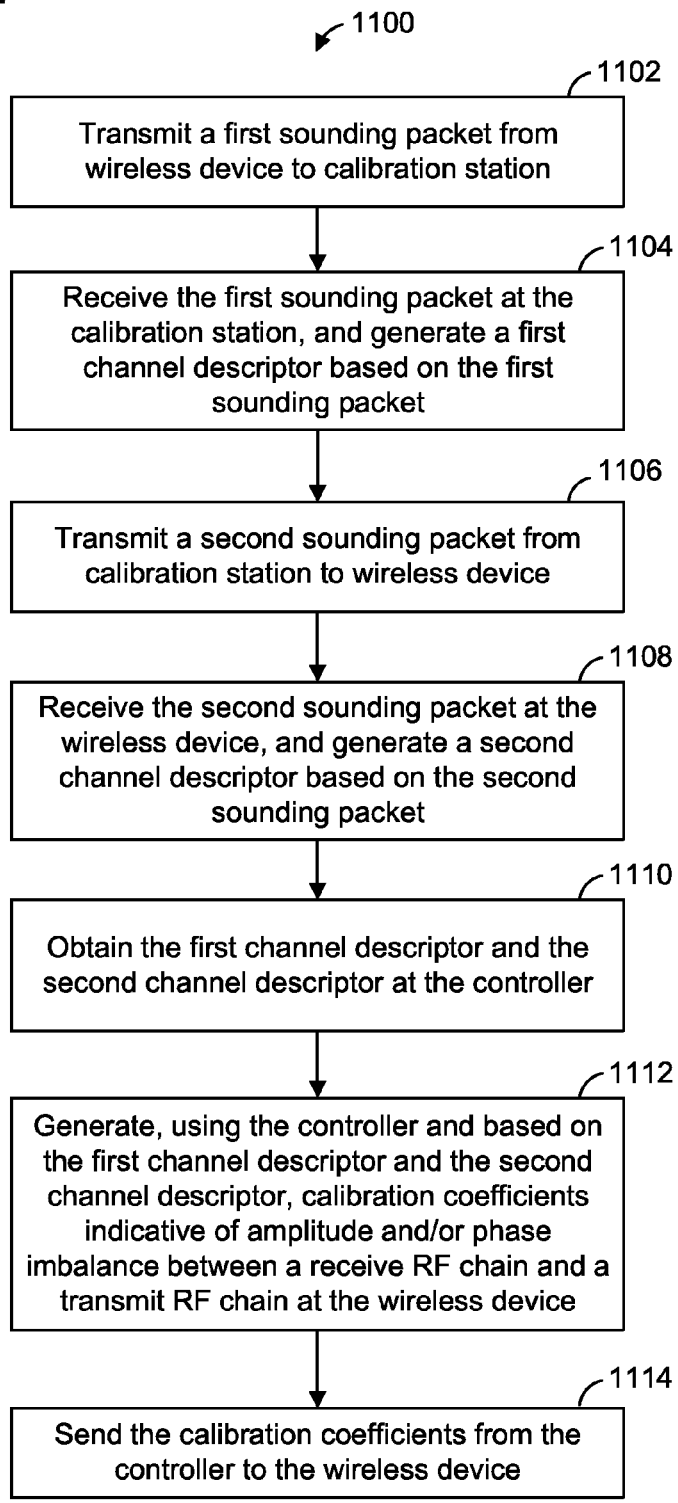
FIG. 11 is a flow diagram of an example method for calibrating a wireless communication device, according to an embodiment.

FIG. 11 is a flow diagram of an example method 1100 for calibrating a wireless communication device, according to an embodiment. With reference to FIG. 5, the method 1100 is performed by the calibration system 500, in an embodiment. For example, the controller 510, the calibration station 502, and the wireless device 504 perform various steps of the method 1100, according to an embodiment. Referring now to FIG. 1, the method 1100 is used for calibrating the AP 14 or the client station 25-1, in an embodiment. In other embodiments, the method 1100 is performed by other suitable calibration systems and/or is used to calibrate other suitable communication devices.

At block 1102, a first sounding packet is transmitted. The first sounding packet is directed from a wireless device to a calibration station. Transmission of the first sounding packet is initiated by a controller communicatively coupled to the wireless device and the calibration station, in an embodiment.

Figure 7:
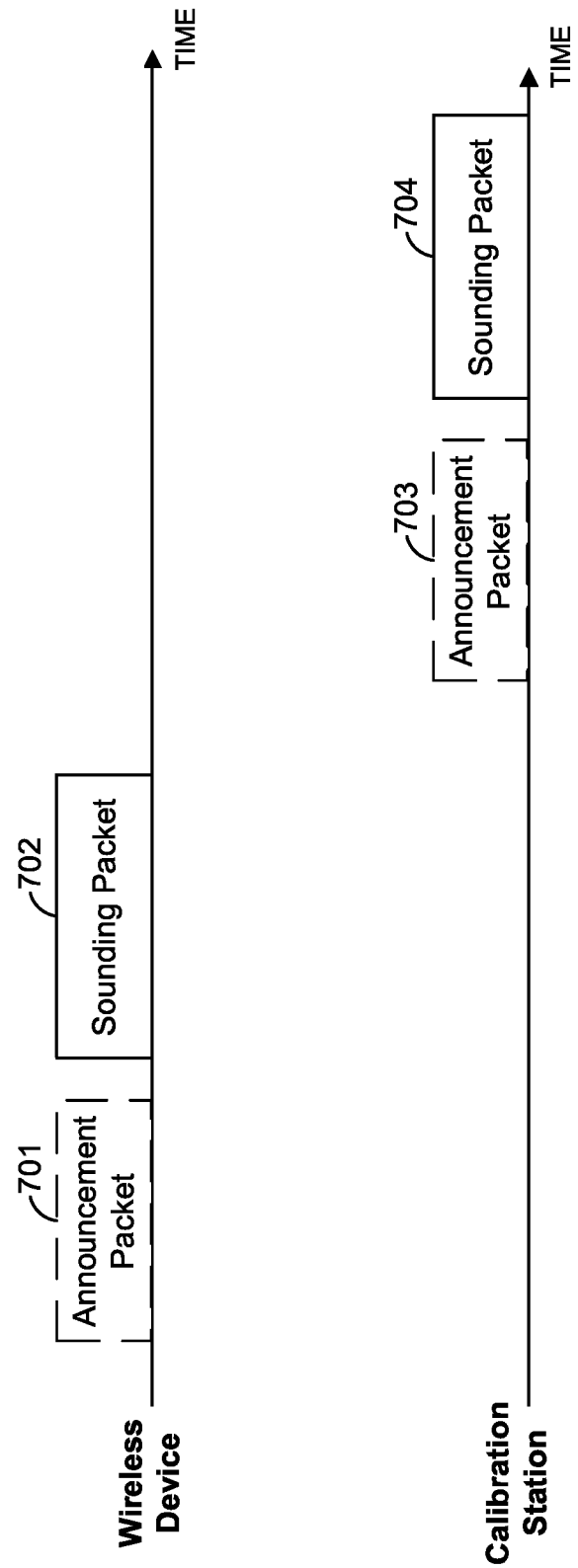

In one embodiment, the sounding packet 702 of FIG. 7 is transmitted. In another embodiment, another suitable sounding packet is transmitted. In some embodiments, transmission of the first sounding packet is preceded by a transmission of a sounding announcement packet, such as an NDPA packet, for example. At block 1104, the first sounding packet is received by the calibration station (e.g., by a VSA included in the calibration station). Upon receiving the first sounding packet, the calibration station generates a first channel descriptor based on the first sounding packet. The first channel descriptor generated at block 1104 includes any suitable information indicative of the communication channel from the wireless device to the calibration station (the forward communication channel with respect to the wireless device). In one embodiment, the first channel descriptor includes I/Q samples of the first sounding packet, for example. As another example, in another embodiment, the first channel descriptor includes a channel matrix generated based on training information included in the first sounding packet. In other embodiments, the first channel descriptor includes other suitable information representative of the forward communication channel, such as a steering matrix calculated based on a channel estimate of the forward communication channel, for example.

At block 1106, a second sounding packet is transmitted. The second sounding packet is directed from the calibration station to the wireless device. The second sounding packet is directed from the calibration station to the wireless device. Transmission of the second sounding packet is initiated by a controller communicatively coupled to the wireless device and the calibration station, in an embodiment. In one embodiment, the sounding packet 704 of FIG. 7 is transmitted. In another embodiment, another suitable sounding packet is transmitted. In some embodiments, transmission of the first sounding packet is preceded by a transmission of a sounding announcement packet, such as an NDPA packet, for example. At block 1108, the second sounding packet is received by the wireless device. Also at block 1108, the wireless device generates a second channel descriptor based on the second sounding packet. The second channel descriptor includes any suitable information indicative of the communication channel from the calibration station to the wireless device (the reverse communication channel with respect to the wireless device). As an example, in one embodiment, the second channel descriptor includes I/Q samples of the second sounding packet, for example. In another embodiment, the second channel descriptor includes a channel estimation generated based on training signals included in the second sounding packet. As just another example, in another embodiment, the second channel descriptor includes a steering matrix calculated based on the channel estimate of the reverse communication channel.

At block 1110, the first channel descriptor generated at block 1104 and the second channel descriptor generated at block 1108 are obtained at the controller. At block 1112, the controller generates, based on the channel descriptors obtained at block 1110, calibration coefficients indicative of a magnitude and/or phase imbalances between transmit and receive RF chains in the wireless device. The calibration coefficients are generated at block 1112 using any suitable method for generating calibration coefficients based on information indicative of a forward channel and a reverse communication channel relative to a communication device. As an example, in one embodiment, the calibration coefficients are generated at block 1112 in accordance with the method 800 of FIG. 8. As another example, in another embodiment, the calibration coefficients are generated at block 1112 in accordance with the method 900 of FIG. 9, or with the method 1000 of FIG. 10.

At block 1114, the controller sends the calibration coefficients generated at block 1112 to the wireless communication device being calibrated. In an embodiment, the wireless communication device stores the correction matrix in a memory and subsequently utilizes the correction matrix when conducting implicit beamforming when communication with another wireless device, such as when operating in the WLAN 10 of FIG. 1, for example.

At least some of the various blocks, operations, and techniques described above may be implemented utilizing hardware, a processor executing firmware instructions, a processor executing software instructions, or any combination thereof.

When implemented in hardware, the hardware may comprise one or more of discrete components, an integrated circuit, an application-specific integrated circuit (ASIC), a programmable logic device (PLD), etc.

When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. Likewise, the software or firmware instructions may be delivered to a user or a system via any known or desired delivery method including, for example, on a computer readable disk or other transportable computer storage mechanism or via communication media. Communication media typically embody computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software or firmware instructions may be delivered to a user or a system via a communication channel such as a telephone line, a DSL line, a cable television line, a fiber optics line, a wireless communication channel, the Internet, etc. (which are viewed as being the same as or interchangeable with providing such software via a transportable storage medium). The software or firmware instructions may include machine readable instructions that, when executed by the processor, cause the processor to perform various acts.

While the present invention has been described with reference to specific examples, which are intended to be illustrative only and not to be limiting of the invention, changes, additions and/or deletions may be made to the disclosed embodiments without departing from the scope of the invention. For example, one or more portions of methods or techniques described above may be performed in a different order (or concurrently) without altering the principles of the present disclosure.

What is claimed is:

1. A method of calibrating a wireless communication device, the method comprising:
    transmitting, from the wireless communication device to a calibration station, a first sounding packet;
    at the calibration station (i) receiving the first sounding packet and (ii) generating, based on the first sounding packet, a first channel descriptor;

transmitting, from the calibration station to the wireless communication device, a second sounding packet;

at the wireless communication device (i) receiving the second sounding packet and (ii) generating, based on the second sounding packet, a second channel descriptor;

obtaining, at a controller separate from the wireless communication device, the first channel descriptor and the second channel descriptor, including obtaining the second channel descriptor via a wired communication link between the wireless communication device and the controller;

generating, using the controller and based on the first channel descriptor and the second channel descriptor, calibration coefficients indicative of one or both of (i) phase imbalance and (ii) amplitude imbalance between a receive radio frequency (RF) chain and a transmit RF chain at the wireless communication device; and sending the calibration coefficients from the controller to the wireless communication device via the wired communication link so that the wireless communication device can use the calibration coefficients to compensate for the one or both of (i) the phase imbalance and (ii) the amplitude imbalance between the receive RF chain and the transmit RF chain at the wireless communication device.

2. The method of claim 1, wherein:
the wired communication link is a first wired communication link; and
obtaining the first channel descriptor comprises obtaining the first channel descriptor via a second wired communication link between the controller and the calibration station.

3. The method of claim 2, wherein the first wired communication link is the same as the second wired communication link.

4. The method of claim 2, wherein the first wired communication link is different than the second wired communication link.

5. The method of claim 1, further comprising using the controller to cause transmission of (i) the first sounding packet and (ii) the second sounding packet.

6. The method of claim 1, wherein receiving the first sounding packet at the calibration station comprises receiving the first sounding packet at a vector signal analyzer included in the calibration station.

7. The method of claim 1, wherein transmitting the second sounding packet from the calibration station comprises transmitting the second sounding packet from a vector signal generator included in the calibration station.

8. The method of claim 1, wherein the second sounding packet is generated using a software that simulates operation of the wireless communication device.

9. The method of claim 1, wherein the second sounding packet is generated at least by:
using a vector signal analyzer (VSA) to capture a sounding packet transmitted by (i) the wireless communication device or (ii) another wireless communication device,
generating in-phase/quadrature phase (I/Q) samples corresponding to the captured sounding packet; and
generating the sounding packet using the I/Q samples.

10. The method of claim 1, wherein the second sounding packet is a null data packet (NDP) sounding packet.

11. The method of claim 9, further comprising:
transmitting a first NDP announcement (NDPA) packet prior to transmitting the first sounding packet; and
transmitting a second NDPA packet prior to transmitting the second sounding packet.

12. The method of claim 11, wherein the second NDPA includes one or both of (i) a medium access control (MAC) address associated with the wireless communication device and (ii) a medium access control (MAC) address associated with the calibration station.

13. The method of claim 1, wherein:
the wired communication link is a first wired communication link;
transmitting the first sounding packet comprises transmitting the first sounding packet via a second wired communication link between the wireless communication device and the calibration station; and
transmitting the second sounding packet comprises transmitting the second sounding packet via the second wired communication link.

14. The method of claim 13, wherein:
the second wired communication link includes a power splitter/combiner unit;
transmitting the first sounding packet via the second wired communication link comprises transmitting the first sounding packet via the power splitter/combiner unit; and
transmitting the second sounding packet via the second wired communication link comprises transmitting the second sounding packet via the power splitter/combiner unit.

15. A calibration system, comprising:
a calibration station configured to:
  receive a first sounding packet from a wireless communication device,
  generate a first channel descriptor based on the first sounding packet, and
  transmit a second sounding packet to the wireless communication device; and
a controller separate from the wireless communication device, the controller i) communicatively coupled to the calibration station and ii) communicatively coupled to the wireless communication device via a wired communication link, the controller configured to:
  obtain the first channel descriptor from the calibration station,
  obtain a second channel descriptor via the wired communication link, wherein the second channel descriptor is generated by the wireless communication device based on the second sounding packet,
  generate, based on the first channel descriptor and the second channel descriptor, calibration coefficients indicative of one or both of (i) phase imbalance and (ii) amplitude imbalance between a receive radio frequency (RF) chain and a transmit RF chain at the wireless communication device, and
  send the calibration coefficients from the controller to the wireless communication device via the wired communication link so that the wireless communication device can use the calibration coefficients to compensate for the one or both of (i) the phase imbalance and (ii) the amplitude imbalance between the receive RF chain and the transmit RF chain at the wireless communication device.

16. The calibration system of claim 15, wherein the calibration system includes the wireless communication device.

17. The calibration system of claim 15, wherein the calibration station is configured to transmit the second sounding packet wirelessly.

18. The calibration system of claim 15, wherein:
the wired communication link is a first wired communication link; and the calibration station is configured to transmit the second sounding packet via a second wired communication link between the calibration station and the wireless communication device.

19. The calibration system of claim 18, wherein the second wired communication link includes a power splitter/combiner unit coupled i) to the calibration station, and al to the wireless communication device.

20. The calibration system of claim 15, wherein the controller is further configured to cause the calibration station to transmit the second sounding packet.

21. The calibration system of claim 15, wherein the calibration station comprises one or more vector signal analyzers and one or more vector signal generators.

22. The calibration system of claim 21, wherein the calibration station is configured to receive the first sounding packet at each of the one or more vector signal analyzers included in the calibration station.

23. The calibration system of claim 21, wherein the calibration station is configured to transmit the second sounding packet from each of the one or more vector signal generators included in the calibration station.

24. The calibration system of claim 15, wherein the second sounding packet is generated using a software that simulates operation of the wireless communication device.

25. The calibration system of claim 15, wherein the second sounding packet is generated at least by:
using a vector signal analyzer (VSA) to capture a sounding packet transmitted by (i) the wireless communication device or (ii) another wireless communication device,
generating in-phase/quadrature phase (I/Q) samples corresponding to the captured sounding packet; and
generating the sounding packet using the I/Q samples.

26. The calibration system of claim 15, wherein the second sounding packet is a null data packet (NDP) sounding packet.

27. The calibration system of claim 15, wherein the calibration station is further configured to transmit an NDP announcement (NDPA) packet prior to transmitting the second sounding packet.

28. The calibration system of claim 27, wherein the NDPA includes one or both of (i) a medium access control (MAC) address associated with the wireless communication device and (ii) a medium access control (MAC) address associated with the calibration station.

29. The calibration system of claim 15, wherein:
the wired communication link is a first wired communication link;
the controller is communicatively coupled to the calibration station via a second wired communication link; and
the controller is configured to obtain the first channel descriptor via the second wired communication link.

30. The calibration system of claim 29, wherein the first wired communication link is the same as the second wired communication link.

31. The calibration system of claim 29, wherein the first wired communication link is different than the second wired communication link.

* * * * *